US012719218B2

(12) United States Patent
Lee

(10) Patent No.: US 12,719,218 B2
(45) Date of Patent: Aug. 25, 2026

(54) BOARD TO BOARD CONNECTOR

(71) Applicant: LS MTRON LTD., Anyang-si (KR)

(72) Inventor: Su Chan Lee, Anyang-si (KR)

(73) Assignee: LS MTRON LTD., Anyang-si (KR)

(*) Notice: Subject to any disclaimer, the term of this patent is extended or adjusted under 35 U.S.C. 154(b) by 235 days.

(21) Appl. No.: 18/278,162

(22) PCT Filed: Mar. 8, 2022

(86) PCT No.: PCT/KR2022/003265

§ 371 (c)(1),
(2) Date: Aug. 21, 2023

(87) PCT Pub. No.: WO2022/191579

PCT Pub. Date: Sep. 15, 2022

(65) Prior Publication Data

US 2024/0128687 A1 Apr. 18, 2024

(30) Foreign Application Priority Data

Mar. 11, 2021 (KR) ........................ 10-2021-0032183
Dec. 27, 2021 (KR) ........................ 10-2021-0188430

(51) Int. Cl.

*H01R 13/6581* (2011.01)
*H01R 13/641* (2006.01)
*H01R 24/40* (2011.01)

(52) U.S. Cl.

CPC ....... *H01R 13/6581* (2013.01); *H01R 13/641* (2013.01); *H01R 24/40* (2013.01)

(58) Field of Classification Search

None
See application file for complete search history.

(56) References Cited

U.S. PATENT DOCUMENTS

2004/0259421 A1* 12/2004 Lai .................. H01R 13/65912 439/607.45
2005/0181661 A1* 8/2005 Kaneko ................ H01R 9/0524 439/427

(Continued)

FOREIGN PATENT DOCUMENTS

JP 2020068163 A 4/2020
KR 1020130011430 1/2013

(Continued)

OTHER PUBLICATIONS

International Search Report for related International Application No. PCT/KR2022/003265; action dated Sep. 15, 2022; (3 pages).

(Continued)

*Primary Examiner* — Oscar C Jimenez
(74) *Attorney, Agent, or Firm* — K&L Gates LLP

(57) ABSTRACT

The present disclosure may comprise: a first RF contact for transmitting a radio frequency (RF) signal; a second RF contact disposed away from the first RF contact along a first axis direction; an insulating part to which the first RF contact and the second RF contact are coupled; a cover shell coupled to the insulating part; a first coaxial cable electrically connected to the first RF contact; a second coaxial cable located away from the first coaxial cable along the first axis direction and electrically connected to the second RF contact; and a coupling part for coupling the first coaxial cable and the second coaxial cable to the cover shell such that the first coaxial cable is connected to the first RF contact and the second coaxial cable is connected to the second RF contact.

14 Claims, 15 Drawing Sheets

(56) References Cited

U.S. PATENT DOCUMENTS

| | | | | |
|---|---|---|---|---|
| 2010/0144199 | A1* | 6/2010 | Wu | H01R 9/0515 439/607.41 |
| 2010/0221933 | A1 | 9/2010 | Wu | |
| 2015/0280372 | A1 | 10/2015 | Huang et al. | |
| 2021/0265790 | A1* | 8/2021 | Nakagawa | H01R 13/40 |
| 2021/0320460 | A1* | 10/2021 | Huang | H01R 13/6599 |
| 2024/0322497 | A1* | 9/2024 | Kim | H01R 13/6585 |

FOREIGN PATENT DOCUMENTS

| | | |
|---|---|---|
| KR | 101407933 | 6/2014 |
| KR | 1020140107773 | 9/2014 |
| KR | 1020170079581 | 7/2017 |

OTHER PUBLICATIONS

Written Opinion for related International Application No. PCT/KR2022/003265; action dated Sep. 15, 2022; (4 pages).
Office Action for related Japanese Application No. 2023-552142; action dated Aug. 30, 2024; (4 pages).
Notice of Allowance for related Japanese Application No. 2025-085601; action dated Jun. 2, 2026; (3 pages).

* cited by examiner

I-I

BOARD TO BOARD CONNECTOR

CROSS-REFERENCE TO RELATED APPLICATION

This application is a National Stage of International Application No. PCT/KR2022/003265 filed on Mar. 8, 2022, which claims priority to and the benefit of Korean Patent Application No. 10-2021-0032183, filed on Mar. 11, 2021, and Korean Patent Application No. 10-2021-0188430, filed on Dec. 27, 2021, the disclosures of which are incorporated herein by reference in its entirety.

FIELD

The present disclosure relates to a connector which is installed in an electronic device for electrical connection.

BACKGROUND

A connector is provided in various electronic devices for electrical connection. For example, the connector is installed in an electronic device such as a mobile phone, a computer, a tablet computer and the like such that various parts that are installed in the electronic device can be electrically connected to each other.

In general, among electronic devices, RF connectors that transmit radio frequency (RF) signals are provided inside wireless communication devices such as smartphones, tablet PCs and the like, and board-to-board connectors (hereinafter, referred to as 'board connectors') that process digital signals are provided in cameras and the like.

FIG. 1 is a conceptual perspective view showing an electrical connection method by using a conventional board connector.

Referring to FIG. 1, when the first module 11 and the second module 12 are disposed to be spaced apart from each other in an electronic device 10, conventionally, the first module 11 and the second module 12 have been electrically connected by using a first board connector 14 and a second board connector 15 that are electrically connected to each other through a flexible printed circuit board (FPCB) 13.

The flexible circuit board 13 has flexibility, and not only when the first module 11 and the second module 12 are spaced apart from each other, but also when the first module 11 and the second module 12 are arranged to face in different directions, it enables an electrical connection by using board connectors 14, 15.

However, since the flexible circuit board 13 has a higher unit price than a general printed circuit board (PCB), there is a problem in that the cost for electrically connecting the modules 11, 12 that are spaced apart from each other increases. In addition, this problem is further exacerbated as the distance between the first module 11 and the second module 12 increases.

SUMMARY

The present disclosure has been devised to solve the above-described problems, and is directed to providing a connector which is capable of reducing the cost for electrically connecting modules that are disposed to be spaced apart from each other.

Technical Solution

In order to solve the above problems, the present disclosure may include the following configurations.

The connector according to the present disclosure may include a first RF contact for transmitting a radio frequency (RF) signal; a second RF contact which is disposed away from the first RF contact along a first axis direction (X-axis direction); an insulating part to which the first RF contact and the second RF contact are coupled; a cover shell which is coupled to the insulating part; a first coaxial cable which is electrically connected to the first RF contact; a second coaxial cable which is located away from the first coaxial cable along the first axis direction (X-axis direction) and electrically connected to the second RF contact; and a coupling part for coupling the first coaxial cable and the second coaxial cable to the cover shell such that the first coaxial cable is connected to the first RF contact and the second coaxial cable is connected to the second RF contact. The rear surface of the cover shell may be formed to be open such that the first coaxial cable and the second coaxial cable are inserted therein, and the coupling part may be grounded by means of the cover shell to be able to block the rear surface.

According to the present disclosure, the following effects can be achieved.

The present disclosure is implemented such that the first module and the second module that are disposed to be spaced apart from each other can be electrically connected by using a board connector and a cable having flexibility. Therefore, in the present disclosure, not only when the first module and the second module are spaced apart from each other, but also when the first module and the second module are arranged to face in different directions, it is possible to implement an electrical connection through a board connector by using a coaxial cable that is relatively cheaper than a flexible circuit board. Accordingly, according to the present disclosure, it is possible to reduce the cost for electrically connecting the first module and the second module that are disposed to be spaced apart from each other.

Since the present disclosure can transmit a plurality of RF signals by using a plurality of coaxial cables, it can be suitably utilized in electronic devices such as mobile devices or antenna transceivers that require multiple signals to be transmitted in a limited space.

The connector according to the present disclosure is implemented to couple a plurality of coaxial cables to the cover shell by using a coupling part. Therefore, the connector according to the present disclosure can improve the convenience and ease of the operation of connecting a plurality of coaxial cables to a plurality of RF contacts.

The connector according to the present disclosure is implemented to shield the rear surface of the cover shell by using a coupling part. Accordingly, the connector according to the present disclosure can prevent the shielding performance from being deteriorated due to the rear surface of the cover shell that is opened so that the coaxial cables are inserted.

DETAILED DESCRIPTION

Hereinafter, the exemplary embodiments of the connector according to the present disclosure will be described in detail with reference to the accompanying drawings. Meanwhile, hatched portions in FIGS. 8 to 15 do not mean cross-sections, but are indicated to distinguish each configuration.

Figure 2:
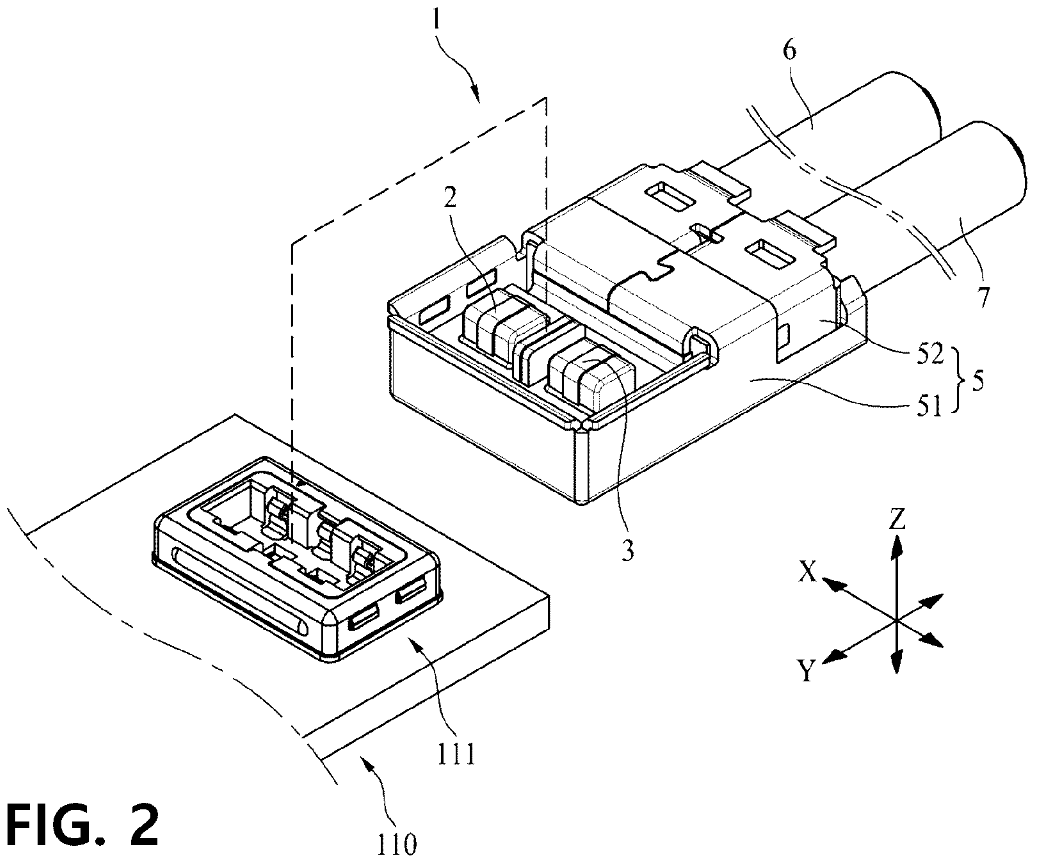
FIG. 2 is a schematic perspective view showing a state in which the connector according to the present disclosure is coupled to a counterpart connector.
Figure 3:
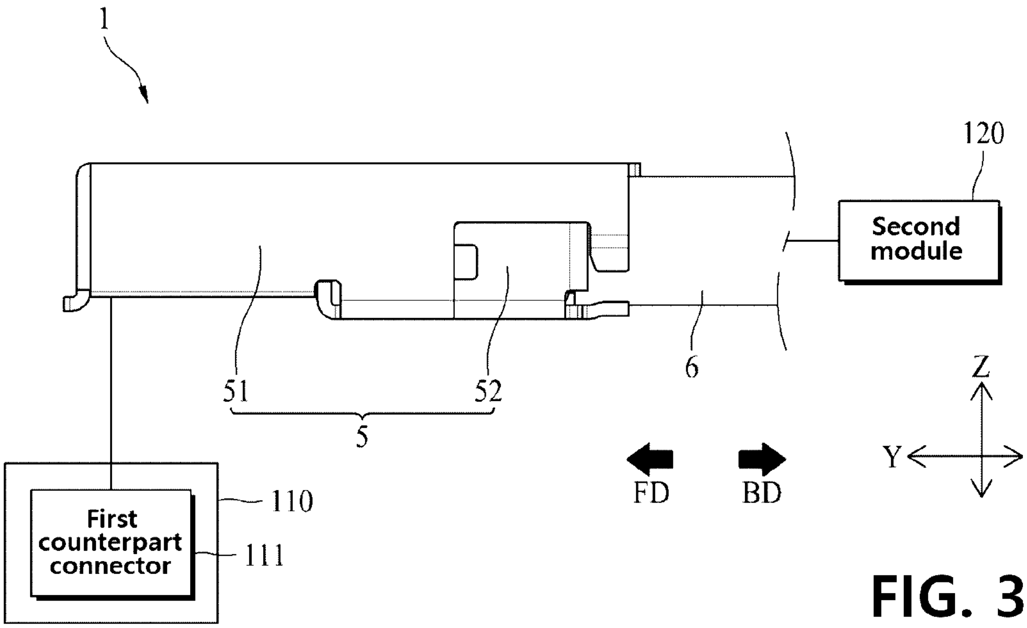
FIG. 3 is a schematic side view showing a state in which the connector according to the present disclosure connects a first module and a second module.
Figure 4:
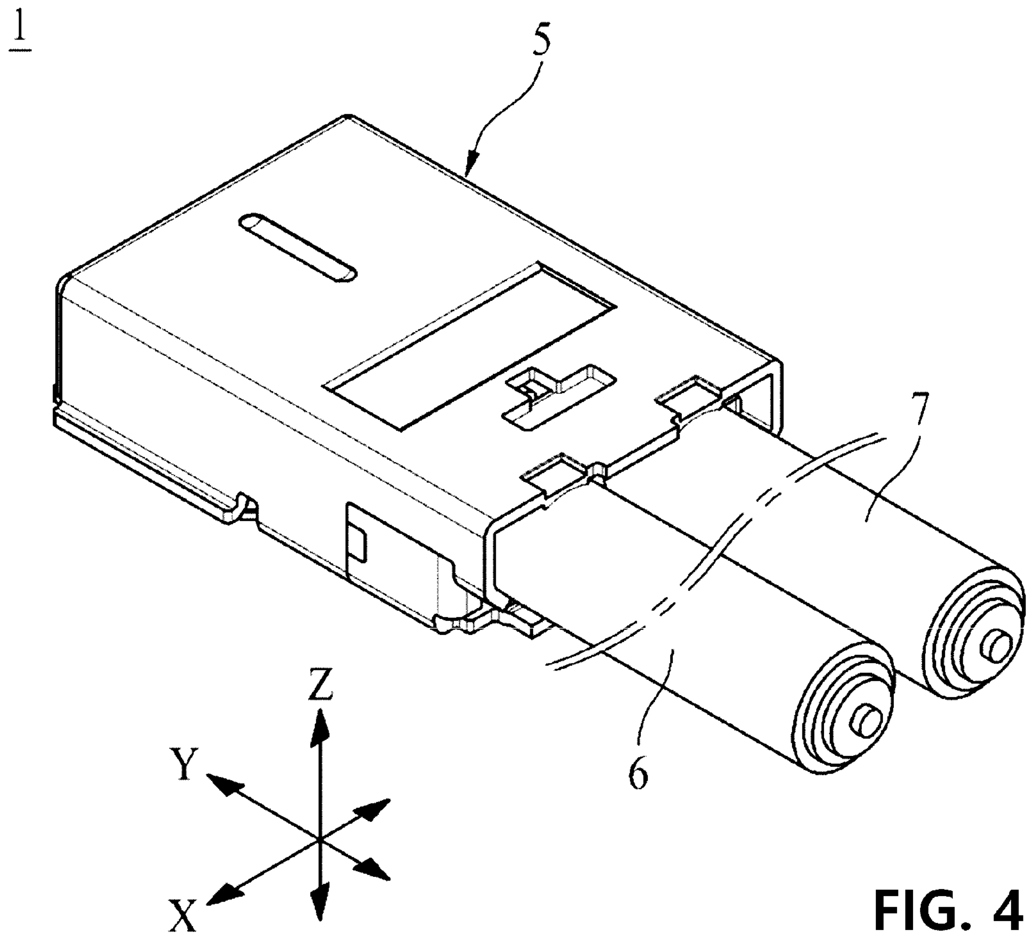
FIG. 4 is a schematic perspective view of the connector according to the present disclosure.

Referring to FIGS. 2 and 3, the connector 1 according to the present disclosure may be installed in an electronic device (not illustrated) such as a mobile phone, a computer, a tablet computer and the like. The connector 1 according to the present disclosure may be used to electrically connect a plurality of modules that are disposed to be spaced apart from each other in an electronic device. For example, in the connector 1 according to the present disclosure, one side may be coupled to the first module 110 and the other side may be coupled to the second module 120 so as to electrically connect the first module 110 and the second module 120 that are disposed to be spaced apart from each other. The modules may be configurations constituting components that are used for electronic device communication, such as an antenna, a main board and the like. For example, when the first module 110 and the second module 120 are electrically connected, the first module 110 may be an antenna module, and the second module 120 may be a driving module for driving the antenna module or a transceiver module for transmitting and receiving signals to and from the antenna module. Herein, the first module 110 and the second module 120 are described for distinguishing different modules from each other, and it will be apparent to those skilled in the art that it does not refer to a specific type of module.

Referring to FIGS. 2 to 5, the connector 1 according to the present disclosure may include a first RF contact 2, a second RF contact 3, an insulating part 4, a cover shell 5, and a first coaxial cable 6 and a second coaxial cable 7.

The first RF contact 2 and the second RF contact 3 are for the transmission of radio frequency (RF) signals. The second RF contact 3 may be disposed to be spaced apart from the first RF contact 2 in a first axial direction (X-axis direction).

The insulating part 4 is to be coupled to the first RF contact 2 and the second RF contact 3. The insulating part 4 may be coupled to the cover shell 5. The first RF contact 2 and the second RF contact 3 may be connected to the RF contacts of the first counterpart connector 111 of the first module 110 in a state of being supported by the insulating part 4.

The cover shell 5 is coupled to the insulating part 4. The cover shell 5 may accommodate the insulating part 4 therein. The rear surface of the cover shell 5 may be opened such that the first coaxial cable 6 and the second coaxial cable 7 are inserted therein. Accordingly, the first coaxial cable 6 and the second coaxial cable 7 may be inserted into the cover shell 5 through the rear surface of the cover shell 5 such that the first RF contact 2 may be electrically connected to the second RF contact 3. The rear surface of the cover shell 5 refers to a surface facing the rear side (BD arrow direction) with respect to the second axis direction (Y-axis direction) perpendicular to the first axis direction (X-axis direction). The rear side (BD arrow direction) may be a direction from the first RF contact 2 and the second RF contact 3 toward the first coaxial cable 6 and the second coaxial cable 7.

The first coaxial cable 6 is electrically connected to the first RF contact 2. The first coaxial cable 6 may be connected to the first counterpart connector 111 of the first module 110 through the first RF contact 2. Accordingly, the first coaxial cable 6 may be electrically connected to the first module 110. The first coaxial cable 6 may be electrically connected to the second module 120 that is disposed to be spaced apart from the first module 110 while being electrically connected to the first module 110 by using flexibility. For example, as shown in FIG. 3, while one side of the first coaxial cable 6 is connected to the first counterpart connector 111 of the first module 110, the other side may be directly electrically connected to the second module 120 such that the first module 110 and the second module 120 may be electrically connected. The first coaxial cable 6 has one side connected to the first counterpart connector 111 of the first module 110, and the other end is connected to the second counterpart connector (not illustrated) of the second module 120 such that the first module 110 and the second module 120 may be electrically connected. Accordingly, the first module 110 and the second module 120 may be electrically connected to each other through the first coaxial cable 6 while being disposed to be spaced apart from each other.

The second coaxial cable 7 is electrically connected to the second RF contact 3. The second coaxial cable 7 may be connected to the first counterpart connector 111 of the first module 110 through the second RF contact 3. Accordingly, the second coaxial cable 7 may be electrically connected to the first module 110. The second coaxial cable 7 may be electrically connected to the second module 120 that is disposed to be spaced apart from the first module 110 while being electrically connected to the first module 110 by using flexibility. For example, the second coaxial cable 7 has one side connected to the first counterpart connector 111 of the first module 110 and the other side is directly electrically connected to the second module 120 such that the first module 110 and the second module 120 may be electrically connected. The second coaxial cable 7 has one side connected to the first counterpart connector 111 of the first module 110, and the other side is connected to the second counterpart connector (not illustrated) of the second module 120 such that the first module 110 and the second module 120 may be electrically connected. Accordingly, the first module 110 and the second module 120 may be electrically connected to each other through the second coaxial cable 7 while being disposed to be spaced apart from each other.

Accordingly, the connector 1 according to the present disclosure can achieve the following effects.

Figure 1:
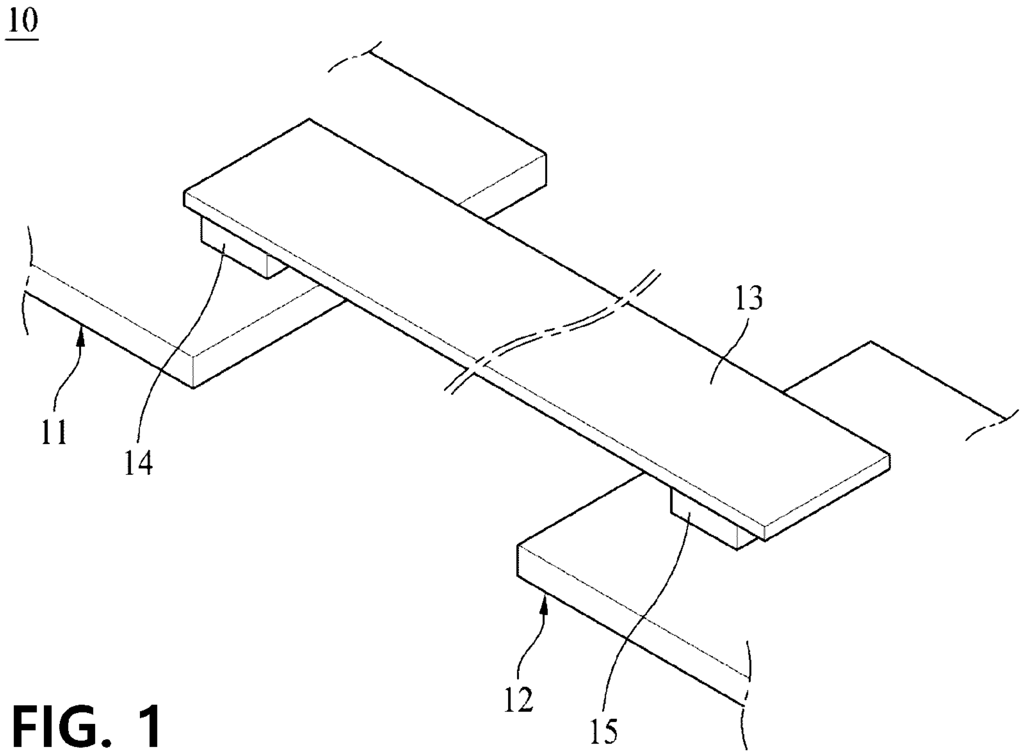
FIG. 1 is a conceptual perspective view showing an electrical connection method by using a conventional board connector.

First, the connector 1 according to the present disclosure is implemented such that the first module 110 and the second module 120 that are disposed to be spaced apart may be electrically connected by using the first coaxial cable 6 and the second coaxial cable 7 having flexibility. Therefore, the connector 1 according to the present disclosure may implement an electrical connection through the first board connector 34 by using the relatively inexpensive coaxial cables 6, 7 compared to a flexible circuit board 13 (illustrated in FIG. 1), not only when the first module 110 and the second module 120 are spaced apart from each other, but also when the first module 110 and the second module 120 are arranged to face in different directions from each other. Accordingly, compared to the comparative example of using a flexible circuit board 13 (illustrated in FIG. 1), the connector 1 according to the present disclosure may reduce the cost for electrically connecting the first module 110 and the second module 120.

Second, the connector 1 according to the present disclosure is implemented to transmit a plurality of RF signals by using the first coaxial cable 6 and the second coaxial cable 7. Therefore, compared to the comparative example of using one coaxial cable, the connector 1 according to the present disclosure may be more suitably utilized in electronic devices such as mobile devices or antenna transmission/reception devices that require the transmission of multiple signals in a limited space.

Referring to FIGS. 4 to 9, the connector 1 according to the present disclosure may include a coupling part 8.

The coupling part 8 couples the first coaxial cable 6 and the second coaxial cable 7 to the cover shell 5. The coupling part 8 may couple the first coaxial cable 6 to the cover shell 5 such that the first coaxial cable 6 is connected to the first RF contact 2, and may couple the second coaxial cable 7 to the cover shell 5 such that the second coaxial cable 7 is connected to the second RF contact 3. By being coupled to the cover shell 5 in a state of being coupled to the first coaxial cable 6 and the second coaxial cable 7, the coupling part 8 may couple the first coaxial cable 6 and the second coaxial cable 7 to the cover shell 5. The coupling part 8 may be disposed to cover the rear surface of the cover shell 5. The coupling part 8 may be grounded through the cover shell 5 to shield the rear surface of the cover shell 5. Accordingly, the connector 1 according to the present disclosure can achieve the following effects.

First, the connector 1 according to the present disclosure may couple the first coaxial cable 6 and the second coaxial cable 7 to the cover shell 5 such that the first coaxial cable 6 is connected to the first RF contact, and the second coaxial cable 7 is connected to the second RF contact 3 by using the coupling part. Accordingly, the connector 1 according to the present disclosure may improve the convenience and easiness of the operation of connecting a plurality of coaxial cables to a plurality of RF contacts.

Second, the connector 1 according to the present disclosure uses the coupling part 8 to shield the rear surface of the cover shell 5. Accordingly, the rear surface of the cover shell 5 is implemented such that the remaining part except for the part where the first coaxial cable 6 and the second coaxial cable 7 are inserted is shielded by the coupling part 8. Therefore, the connector 1 according to the present disclosure may prevent electromagnetic waves that are generated inside the cover shell 5 from being radiated to the outside through the rear surface from interfering with signals of circuit components located nearby, and may conversely prevent electromagnetic waves that are generated from circuit components located nearby from penetrating into the inside of the cover shell 5 through the rear surface and interfering with RF signals that are generated inside the cover shell 5. Therefore, the connector 1 according to the present disclosure may contribute to improving the electro-magnetic interference (EMI) shielding performance and electro-magnetic compatibility (EMC) performance through the coupling part 8.

Hereinafter, the first RF contact 2, the second RF contact 3, the insulating part 4, the cover shell 5, the first coaxial cable 6, the second coaxial cable 7 and the coupling part 8 will be described in detail with reference to the accompanying drawings.

Referring to FIGS. 2 and 4 to 9, the first RF contact 2 and the second RF contact 3 are provided for the transmission of radio frequency (RF) signals. The first RF contact 2 and the second RF contact 3 may transmit a very high-frequency RF signal. The first RF contact 2 and the second RF contact 3 may be supported by the insulating part 4. The first RF contact 2 and the second RF contact 3 may be coupled to the insulating part 4 through an assembly process. The first RF contact 2 and the second RF contact 3 may be integrally molded with the insulating part 4 through injection molding.

The first RF contact 2 and the second RF contact 3 may be disposed to be spaced apart from each other based on the first axial direction (X-axis direction). The first RF contact 2 and the second RF contact 3 may be electrically connected to the first module 110 by being connected to the first counterpart connector 111. When the connector 1 according to the present disclosure is implemented as a plug connector, the first counterpart connector 111 may be implemented as a receptacle connector. When the connector 1 according to the present disclosure is implemented as a receptacle connector, the first counterpart connector 111 may be implemented as a plug connector.

The first RF contact 2 is electrically connected to the first coaxial cable 6. The first coaxial cable 6 may be inserted into the cover shell 5 through the rear surface of the cover shell 5 to be electrically connected to the first RF contact 2. The first RF contact 2 may be connected to an RF contact of the first counterpart connector 111. Accordingly, the first coaxial cable 6 may be connected to the first counterpart connector 111 through the first RF contact 2. The first RF contact 2 may be connected to the first counterpart connector 111 through a connection hole 54 (illustrated in FIG. 7) formed in the cover shell 5. The first RF contact 2 may be coupled to the insulating part 4 such that at least a portion thereof is positioned on the first RF protrusion 41 of the insulating part 4. The first RF protrusion 41 protrudes outward from the cover shell 5 through the connection hole 54. Accordingly, when the first RF protrusion 41 is inserted into an RF receiving groove (not illustrated) of the first counterpart connector 111, the first RF contact 2 may be electrically connected to an RF connecting member of the first counterpart connector 111. The first RF contact 2 may be formed of a material having electrical conductivity. For example, the first RF contact 2 may be formed of a metal.

The second RF contact 3 is electrically connected to the second coaxial cable 7. The second coaxial cable 7 may be electrically connected to the second RF contact 3 by being inserted into the cover shell 5 through the rear surface of the cover shell 5. The second RF contact 3 may be connected to an RF contact of the first counterpart connector 111. Accordingly, the second coaxial cable 7 may be connected to the first counterpart connector 111 through the second RF contact 3. The second RF contact 3 may be connected to the first counterpart connector 111 through the connection hole 54. The second RF contact 3 may be coupled to the insulating part 4 such that at least a portion thereof is positioned on the second RF protrusion 42 of the insulating part 4. The second RF protrusion 42 protrudes outward from the cover shell 5 through the connection hole 54. The second RF protrusion 42 may be disposed to be spaced apart from the first RF protrusion 41 in the first axial direction (X-axis direction). Accordingly, when the second RF protrusion 42 is inserted into the RF receiving groove, the second RF contact 3 may be electrically connected to an RF connecting member of the first counterpart connector 111. The second RF contact 3 may be formed of a material having electrical conductivity. For example, the first RF contact 2 may be formed of a metal.

Meanwhile, in FIGS. 2 to 10, the connector 1 according to the present disclosure is illustrated as including only two RF contacts 2, 3, but the present disclosure is not limited thereto, and the connector 1 according to the present disclosure may include three or more RF contacts. In this case, the connector 1 according to the present disclosure may be provided with a coaxial cable to correspond to the number of RF contacts. For example, when the connector 1 according to the present disclosure has three RF contacts, three of the coaxial cables may also be provided. In the present specification, the connector 1 according to the present disclosure will be described on the basis of including two RF contacts, that is, the first RF contact 2 and the second RF contact 3. From this, it will be apparent to those skilled in the art to derive an exemplary embodiment in which the connector 1 according to the present disclosure has three or more RF contacts and coaxial cables.

The insulating part 4 is a part to which the first RF contact 2 and the second RF contact 3 are coupled. The insulating part 4 may include an insulating body 40, the first RF protrusion 41, the second RF protrusion 42, a first cable accommodating groove 43 and a second cable accommodating groove 44. The insulating body 40 supports the first RF contact 2 and the second RF contact 3. The first RF contact 2 and the second RF contact 3 may be supported by being coupled to the insulating body 40. The insulating body 40 may be coupled to the cover shell 5 while supporting the first RF contact 2 and the second RF contact 3. The insulating body 40 may be formed of an insulating material. For example, the insulating body 40 may be formed of plastic, rubber or the like. The first RF protrusion 41 and the second RF protrusion 42 may be disposed on a lower surface of the insulating body 40. The connection hole 54 may expose an area in which the first RF protrusion 41 and the second RF protrusion 42 are disposed on the lower surface of the insulating body 40 to the outside. Accordingly, the first RF protrusion 41 and the second RF protrusion 42 may protrude outward from the cover shell 5 through the connection hole 54.

The first cable accommodating groove 43 is for accommodating the first coaxial cable 6. The first cable receiving groove 43 may be implemented by forming a groove having a predetermined depth from the upper surface of the insulating body 40. A portion of the first coaxial cable 6 may be accommodated in the first cable accommodating groove 43. The first coaxial cable 6 may be electrically connected to the first RF contact 2 by being coupled to the insulating part 4 through the first cable receiving groove 43.

The second cable accommodating groove 44 is for accommodating the second coaxial cable 7. The second cable receiving groove 44 may be implemented by forming a groove having a predetermined depth from the upper surface of the insulating body 40. A portion of the second coaxial cable 7 may be accommodated therein. The second coaxial cable 7 may be electrically connected to the second RF contact 3 by being coupled to the insulating part 4 through the second cable receiving groove 44. The first cable accommodating groove 43 and the second cable accommodating groove 44 may be disposed to be spaced apart from each other in the first axial direction (X-axis direction).

The cover shell 5 is coupled to the insulating part 4. The cover shell 5 may accommodate the insulating part 4 therein. Accordingly, the cover shell 5 may protect the insulating part 4, the RF contacts 2, 3 that are coupled to the insulating part 4, and the coaxial cables 6, 7 from the outside. The cover shell 5 may be grounded. Accordingly, the cover shell 5 may implement a shielding function for signals, electromagnetic waves and the like for the RF contacts 2, 3 and the coaxial cables 6, 7. The cover shell 5 may be grounded by being connected to a grounding counterpart contact (not illustrated) of the first counterpart connector 111. The cover shell 5 may be grounded by being connected to a grounding counter pattern (not illustrated) of the first module 11. The cover shell 5 may be formed of a material having electrical conductivity. For example, the cover shell 5 may be formed of a metal.

The cover shell 5 may include a connection hole 54. The connection hole 54 may be formed through one side of the cover shell 5. The connection hole 54 may be used as a passage through which the first RF contact 2 and the second RF contact 3 are connected to the RF contacts of the first counterpart connector 111. The first RF protrusion 41 and the second RF protrusion 42 may be disposed in the connection hole 54. Accordingly, the portion located on the first RF protrusion 41 in the first RF contact 2 and the portion located on the second RF protrusion 42 in the second RF contact 3 may be disposed in the connection hole 54. Therefore, the connector 1 according to the present disclosure may protect the insulating part 4, the RF contacts 2, 3, and the coaxial cables 6, 7 from the outside by using the cover shell 5, and in addition, it may be implemented such that the RF contacts 2, 3 are electrically connected to the first counterpart connector 111 through the connection hole 54.

The cover shell 5 may include a first cover body 51 and a second cover body 52. The first cover body 51 surrounds the insulating part 4. The first cover body 51 may implement a shielding function for the RF contacts 2, 3 and the coaxial cables 6, 7. To this end, the first cover body 51 may include a front shielding member 511 (illustrated in FIG. 6), a left shielding member 512 (illustrated in FIG. 6), a right shielding member 513 (illustrated in FIG. 6), an upper shielding member 514 (illustrated in FIG. 6) and a lower shielding member 515 (illustrated in FIG. 7).

The front shielding member 511 is disposed in front of the insulating part 4 (FD arrow direction). The forward direction (FD arrow direction) refers to a direction that is parallel to the second axis direction (Y-axis direction) perpendicular to the first axis direction (X-axis direction). The front direction (FD arrow direction) may be a direction from the coaxial cables 6, 7 toward the RF contacts 2, 3. The front shielding member 511 may be grounded to implement a shielding function for the RF contacts 2, 3 and the coaxial cables 6, 7 with respect to the front direction (FD arrow direction).

The left shielding member 512 is disposed on the left side (LD arrow direction) of the insulating part 4. The left direction (LD arrow direction) refers to a direction that is parallel to the first axial direction (X-axis direction). The left direction (LD arrow direction) may be a direction from the second coaxial cable 7 toward the first coaxial cable 6. The left shielding member 512 may be grounded to implement a shielding function for the RF contacts 2, 3 and the coaxial cables 6, 7 based on the left side (LD arrow direction).

The right shielding member 513 is disposed on the right side of the insulating part 4 (RD arrow direction). The right side (RD arrow direction) refers to a direction opposite to the left side (LD arrow direction). The right shielding member 513 may be grounded to implement a shielding function for the RF contacts 2, 3 and the coaxial cables 6, 7 based on the right side (RD arrow direction).

The upper shielding member 514 refers to a surface that is disposed on the upper side (UD arrow direction) of the insulating part 4. The upper side (UD arrow direction) means a direction that is parallel to a third axis direction (Z-axis direction) perpendicular to the first axis direction (X-axis direction) and the second axis direction (Y-axis direction). The upper shielding member 514 may be grounded to implement a shielding function for the RF contacts 2, 3 and the coaxial cables 6, 7 based on the upper side (UD arrow direction).

The lower shielding member 515 is disposed on the lower side (DD arrow direction) of the insulating part 4. The lower side (DD arrow direction) refers to a direction opposite to the upper side (UD arrow direction). The connection hole 54 may be formed in the lower shielding member 515. The connection hole 54 may be formed through the lower shielding member 515. The lower shielding member 515 may be grounded to implement a shielding function for the RF contacts 2, 3 and the coaxial cables 6, 7 based on the downward direction (DD arrow direction).

The first cover body 51 may be formed such that the rear surface is open. The rear surface of the cover shell 5 refers to a surface that is disposed to face the front shielding member 511 in the second axial direction (Y-axis direction). The coaxial cables 6, 7 may be electrically connected to the RF contacts 2, 3 by being inserted into the cover shell 5 through the rear surface of the cover shell 5. However, as the rear surface of the first cover body 51 is opened, there may be a problem in that the shielding function for the RF contacts 2, 3 and the coaxial cables 6, 7 with respect to the rear side (BD arrow direction) is reduced. In order to solve this problem, the connector 1 according to the present disclosure is disposed such that the coupling part 8 covers the rear surface of the first cover body 51 such that it is possible to prevent the shielding function of the RF contacts 2, 3 and the coaxial cables 6, 7 from deteriorating based on the rear side (BD arrow direction).

The second cover body 52 is for accommodating the coupling part 8. The coupling part 8 may be inserted into an accommodating groove 521 (illustrated in FIG. 5) of the second cover body 52 to be accommodated in the second cover body 52. The accommodating groove 521 may be disposed at a rear side (BD arrow direction) of the insulating part 4. Accordingly, the coupling part 8 may be disposed to cover the rear surface of the first cover body 51 by being inserted into the accommodating groove 521.

Figure 7:
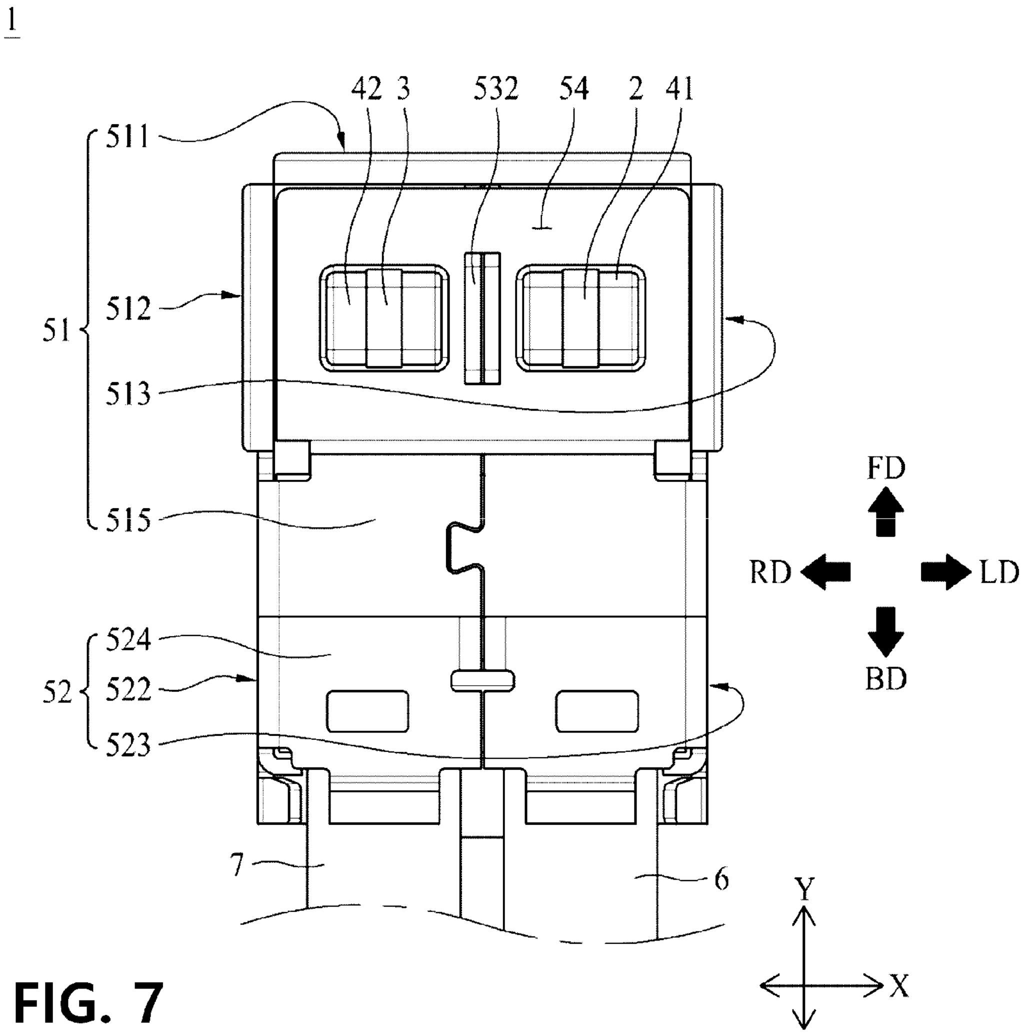
FIG. 7 is a schematic rear view of the connector according to the present disclosure.

The second cover body 52 may include a left support member 522 (illustrated in FIG. 7), a right support member 523 (illustrated in FIG. 7) and a lower support member 524 (illustrated in FIG. 7).

The left support member 522 is disposed on the left side of the accommodating groove 521. The left support member 522 may support the coupling part 8 such that the coupling part 8 inserted into the accommodating groove 521 is restricted from moving in the left direction (LD arrow direction).

The right support member 523 is disposed on the right side of the accommodating groove 521. The right support member 523 may support the coupling part 8 such that the coupling part 8 inserted into the accommodating groove 521 is restricted from moving in the right direction (RD arrow direction).

The lower support member 524 is disposed on the lower side of the accommodating groove 521. The lower support member 524 may support the coupling part 8 such that the coupling part 8 inserted into the accommodating groove 521 is restricted from moving downward (DD arrow direction).

The first cover body 51 may restrict the movement of the coupling part 8 upward (UD arrow direction). To this end, the upper shielding member 514 may be disposed on the upper side of the accommodating groove 521. The upper shielding member 514 may support the coupling part 8 such that the coupling part 8 into which the accommodating groove 521 is inserted is restricted from moving upward (UD arrow direction).

The first cover body 51 and the second cover body 52 may be detachably coupled. Accordingly, the connector 1 according to the present disclosure may improve the easiness of the operation of inserting the insulating part 4, the coupling part 8 and the like into the cover shell 5.

Referring to FIGS. 4 to 10, the first coaxial cable 6 is for electrically connecting the first module 110 and the second module 120. The first module 110 and the second module 120 may be electrically connected to each other through the first coaxial cable 6 even when they are spaced apart from each other. One side of the first coaxial cable 6 may be electrically connected to the first module 110, and the other side may be electrically connected to the second module 120. In this case, the first coaxial cable 6 may be electrically connected to the first module 110 by connecting the first RF contact 2 to an RF contact of the first counterpart connector 111. The first coaxial cable 6 may include a first connection pin 61, a first internal insulating member 62, a first shielding member 63 and a first external insulating member 64.

The first connection pin 61 is electrically connected to the first RF contact 2. The first connection pin 61 may be in contact with the first RF contact 2 to be electrically connected to the first RF contact 2.

The first internal insulating member 62 is coupled to the first connection pin 61. The first internal insulating member 62 may be coupled to the first connection pin 61 to surround the outside of the first connection pin 61. The first connection pin 61 may be coupled to the first internal insulating member 62 such that a portion thereof is exposed to the outside from the first internal insulating member 62. Accordingly, the first connection pin 61 may be implemented such that the remaining portion except for a portion necessary to be electrically connected to the first RF contact 2 is insulated by the first internal insulating member 62. The first internal insulating member 62 may be formed of an insulating material. For example, the first internal insulating member 62 may be formed of rubber.

The first shielding member 63 performs a shielding function for the first connection pin 61. The first shielding member 63 may be grounded through the coupling part 8 to perform a shielding function for the first connection pin 61. Accordingly, the first shielding member 63 may prevent electromagnetic waves, RF signals and the like that are generated from the first connection pin 61 from being radiated to the outside. The first shielding member 63 may be coupled to the first internal insulating member 62 to surround the outside of the first internal insulating member 62. The first shielding member 63 may be formed of an electrically conductive material. For example, the first shielding member 63 may be formed of a metal. The first external insulating member 64 is coupled to the first shielding member 63.

The first external insulating member 64 may be coupled to the first shielding member 63 so as to surround the outside of the first shielding member 63. The first shielding member 63 may be coupled to the first external insulating member 64 such that a portion thereof is exposed to the outside from the first external insulating member 64. Accordingly, the first shielding member 63 is grounded to the coupling part 8 through a portion exposed to the outside from the first external insulating member 64, thereby performing a shielding function for the first connection pin 61. The first external insulating member 64 may be formed of an insulating material. For example, the first external insulating member 64 may be formed of rubber.

The second coaxial cable 7 is for electrically connecting the first module 110 and the second module 120. The first module 110 and the second module 120 may be electrically connected to each other through the second coaxial cable 7 even when they are spaced apart from each other. One side of the second coaxial cable 7 may be electrically connected to the first module 110, and the other side may be electrically connected to the second module 120. In this case, the second coaxial cable 7 may be electrically connected to the first module 110 by connecting the second RF contact 3 to the RF contact of the first counterpart connector 111. The second coaxial cable 7 may include a second connection pin 71, a second internal insulating member 72, a second shielding member 73 and a second external insulating member 74.

The second connection pin 71 is electrically connected to the second RF contact 3. The second connection pin 71 may be in contact with the second RF contact 3 to be electrically connected to the second RF contact 3.

The second internal insulating member 72 is coupled to the second connection pin 71. The second internal insulating member 72 may be coupled to the second connection pin 71 to surround the outside of the second connection pin 71. The second connection pin 71 may be coupled to the second internal insulating member 72 such that a portion thereof is exposed to the outside from the second internal insulating member 72. Accordingly, the second connection pin 71 may be implemented such that the remaining portion except for a portion required to be electrically connected to the second RF contact 3 is insulated by the second internal insulating member 72. The second internal insulating member 72 may be formed of an insulating material. For example, the second internal insulating member 72 may be formed of rubber.

The second shielding member 73 performs a shielding function for the second connection pin 71. The second shielding member 73 may be grounded through the coupling part 8 to perform a shielding function for the second connection pin 71. Accordingly, the second shielding member 73 may prevent electromagnetic waves, RF signals and the like that are generated from the second connection pin 71 from being radiated to the outside. The second shielding member 73 may be coupled to the second internal insulating member 72 to surround the outside of the second internal insulating member 72. The second shielding member 73 may be formed of an electrically conductive material. For example, the second shielding member 73 may be formed of a metal. The second external insulating member 74 is coupled to the second shielding member 73.

The second external insulating member 74 may be coupled to the second shielding member 73 to surround the outside of the second shielding member 73. The second shielding member 73 may be coupled to the second external insulating member 74 such that a portion thereof is exposed to the outside from the second external insulating member 74. Accordingly, the second shielding member 73 is grounded to the coupling part 8 through a portion exposed to the outside from the second external insulating member 74, thereby performing a shielding function for the second connection pin 71. The second external insulating member 74 may be formed of an insulating material. For example, the second external insulating member 74 may be formed of rubber.

Referring to FIGS. 5 to 13, the coupling part 8 couples the first coaxial cable 6 and the second coaxial cable 7 to the cover shell 5. The first coaxial cable 6 and the second coaxial cable 7 may be respectively connected to the first RF contact 2 and the second RF contact 3 through the coupling part 8. The coupling part 8 may be grounded through the cover shell 5 to shield the rear surface of the cover shell 5. The coupling part 8 may be formed of an electrically conductive material. For example, the coupling part 8 may be formed of a metal.

The coupling part 8 may include a coupling body 81, a first alignment hole 82 and a second alignment hole 83.

The coupling body 81 is a portion to which the first coaxial cable 6 and the second coaxial cable 7 are coupled. The first coaxial cable 6 and the second coaxial cable 7 may be coupled to the coupling body 81 to be coupled to the cover shell 5. The coupling body 81 may be inserted into the accommodating groove 521 to couple the first coaxial cable 6 and the second coaxial cable 7 to the cover shell 5. To this end, the first alignment hole 82 and the second alignment hole 83 may be formed in the coupling body 81.

The first alignment hole 82 is a portion through which the first coaxial cable 6 is inserted. The first alignment hole 82 may be formed through the coupling body 81. The first coaxial cable 6 may be inserted into the first alignment hole 82 to be coupled to the coupling body 81. The second alignment hole 83 is a portion through which the second coaxial cable 7 is inserted. The second alignment hole 83 may be formed through the coupling body 81. The second coaxial cable 7 may be inserted into the second alignment hole 83 to be coupled to the coupling body 81. The coupling body 81 may arrange the first coaxial cable 6 such that the first coaxial cable 6 that is inserted in to the first alignment hole 82 is disposed at a position that is connectable to the first RF contact 2. Specifically, when the first coaxial cable 6 is inserted into the first alignment hole 82, the first coaxial cable 6 is supported by the coupling body 81 so as to be disposed at a position that is connectable to the first RF contact 2. That is, the coupling body 81 may guide the connection of the first coaxial cable 6 to the first RF contact 2. A position that is connectable to the first RF contact 2 refers to a position where the first connection pin 61 of the first coaxial cable 6 is in contact with the first RF contact 2. Accordingly, the connector 1 according to the present disclosure may improve the easiness of the operation of connecting the first coaxial cable 6 to the first RF contact 2 by using the coupling body 81. In addition, the connector 1 according to the present disclosure fixes the position of the first coaxial cable 6 with the coupling body 81 such that it is possible to prevent the first coaxial cable 6 from separating from a position to be connected to the first RF contact 2.

The second alignment hole 83 is a portion through which the second coaxial cable 7 is inserted. The second alignment hole 83 may be formed through the coupling body 81. The second coaxial cable 7 may be inserted into the second alignment hole 83 to be coupled to the coupling body 81. The coupling body 81 may arrange the second coaxial cable 7 such that the second coaxial cable 7 inserted into the second alignment hole 83 is disposed at a position that is connectable to the second RF contact 3. Specifically, when the second coaxial cable 7 is inserted into the second alignment hole 83, the second coaxial cable 7 is supported by the coupling body 81 to the second RF contact 3 so as to be disposed at a position that is connectable to the second RF contact 3. That is, the coupling body 81 may guide the connection of the second coaxial cable 7 to the second RF contact 3. A position that is connectable to the second RF contact 3 refers to a position where the second connection pin 71 of the second coaxial cable 7 is in contact with the second RF contact 3. Accordingly, the connector 1 according to the present disclosure may improve the easiness of the operation of connecting the second coaxial cable 7 to the second RF contact 3 by using the coupling body 81. In addition, the connector 1 according to the present disclosure fixes the position of the second coaxial cable 7 with the coupling body 81 such that it is possible to prevent the second coaxial cable 7 from separating from a position to be connected to the second RF contact 3.

The coupling body 81 may include both of the first alignment hole 82 and the second alignment hole 83. Accordingly, in the connector 1 according to the present disclosure, in addition to aligning the first coaxial cable 6 to be disposed at a position that is connectable to the first RF contact 2 by using the coupling body 81, the second coaxial cable 7 may be arranged so as to be disposed at a position that is connectable to the second RF contact 3. Accordingly, the connector 1 according to the present disclosure may further improve the easiness of the operation of aligning the first coaxial cable 6 and the second coaxial cable 7.

Figure 9:
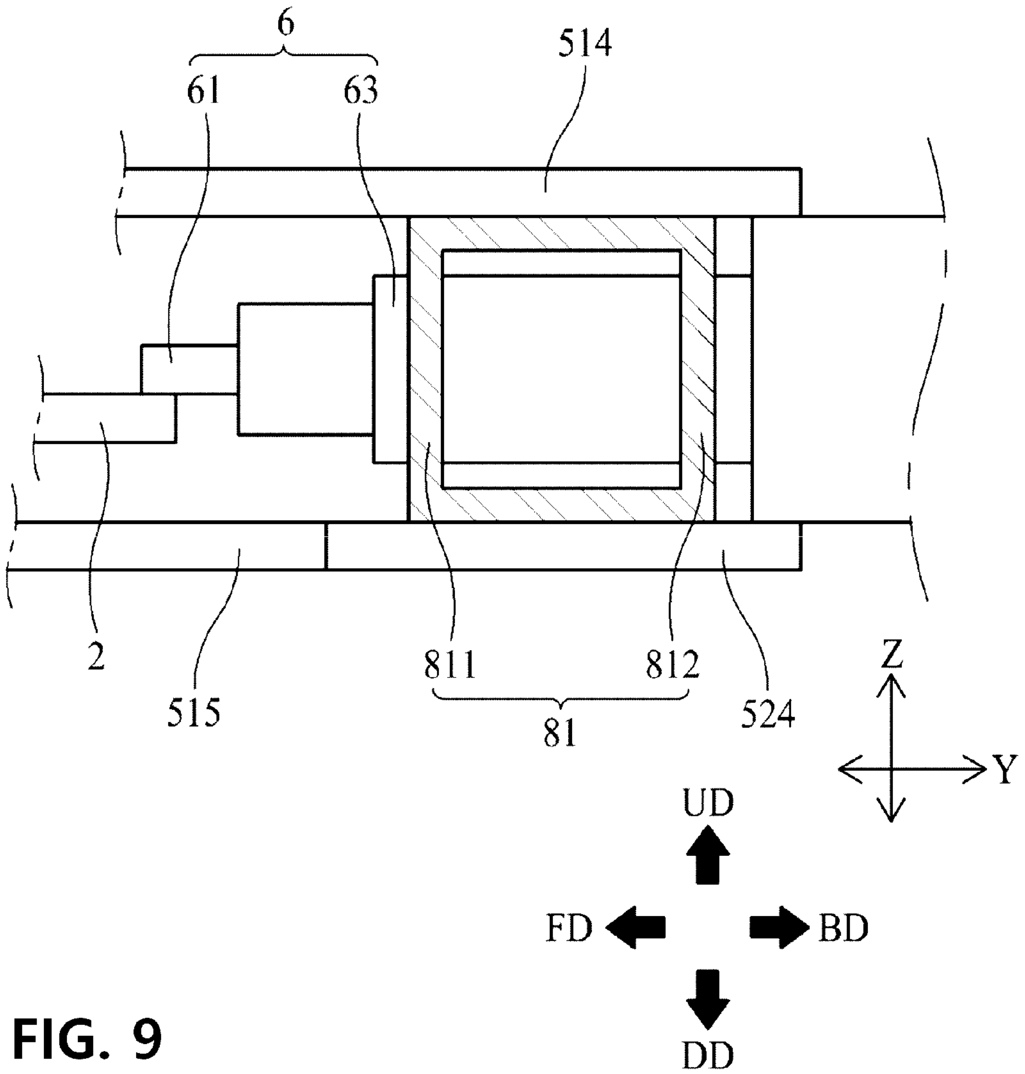
FIG. 9 is a conceptual side view showing the inside of the connector according to the present disclosure.
Figure 10:
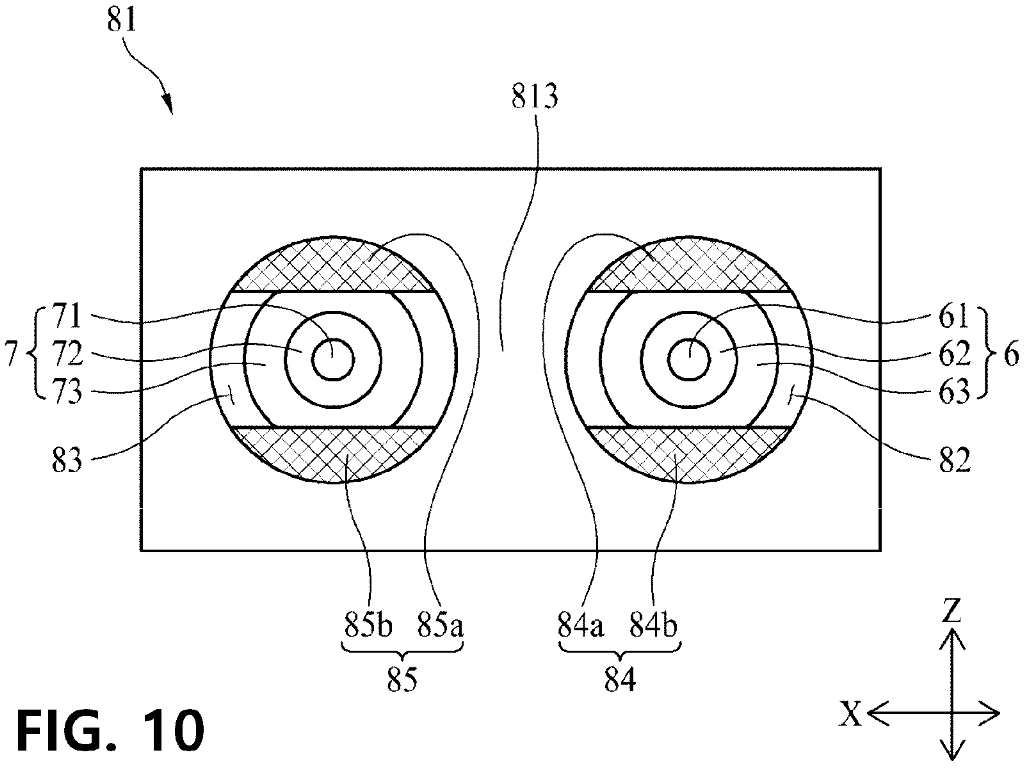
FIG. 10 is a schematic front view for explaining a state in which the first coaxial cable and the second coaxial cable are coupled to the coupling part in the connector according to the present disclosure.
Figure 11:
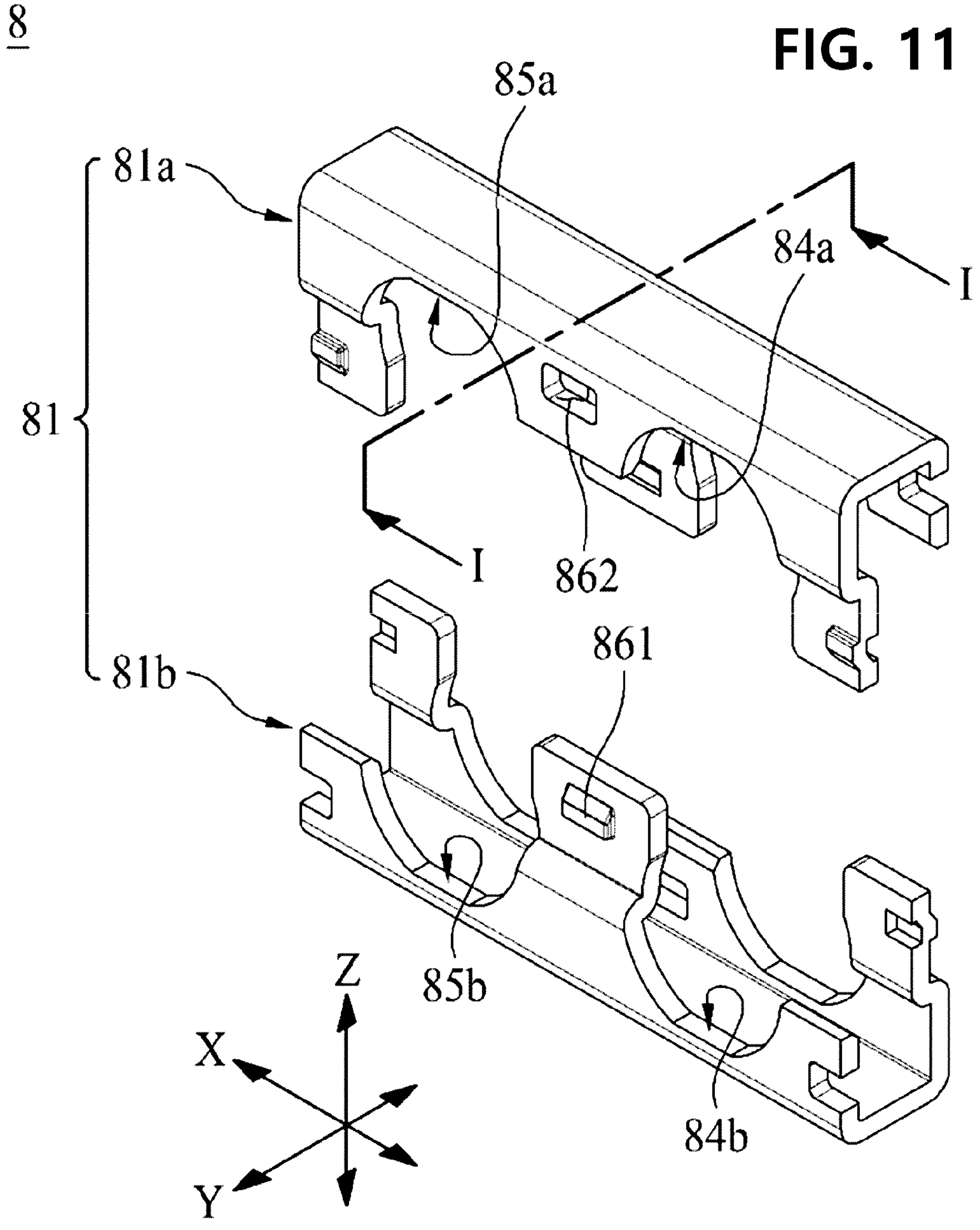
FIG. 11 is an exploded perspective view of a coupling part in the connector according to the present disclosure.
Figure 12:
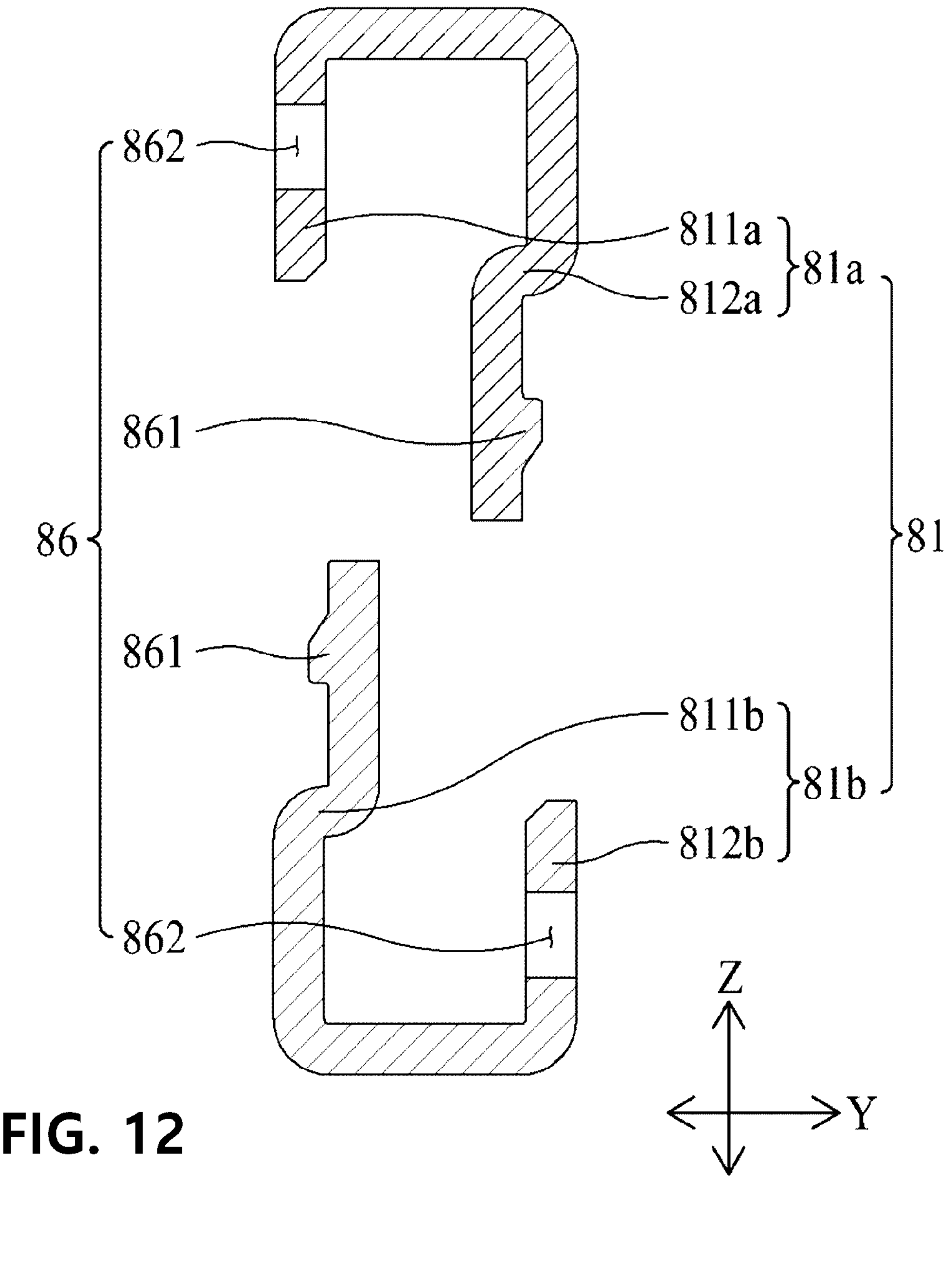
FIG. 12 is a schematic side cross-sectional view taken along line I-I of FIG. 11.
Figure 13:
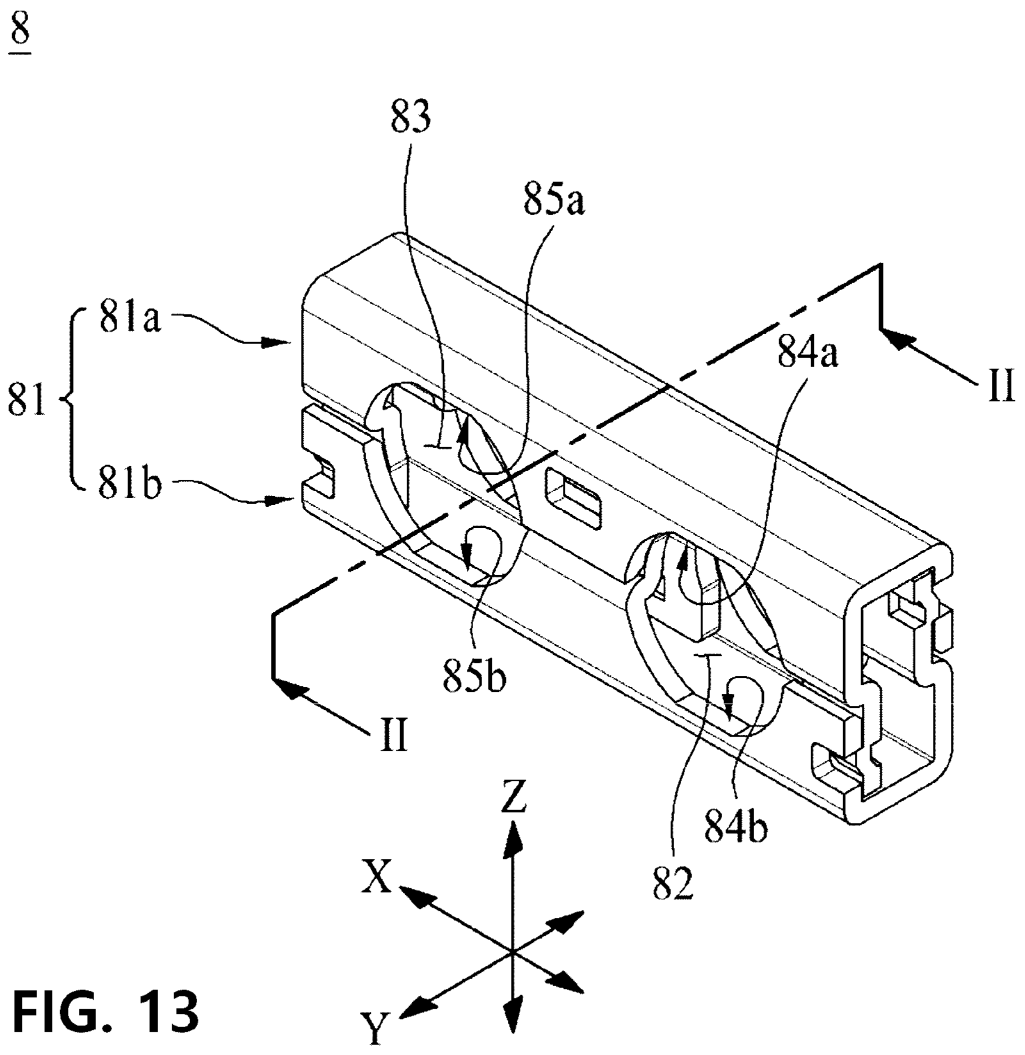
FIG. 13 is an assembled perspective view of the coupling part in the connector according to the present disclosure.
Figure 14:
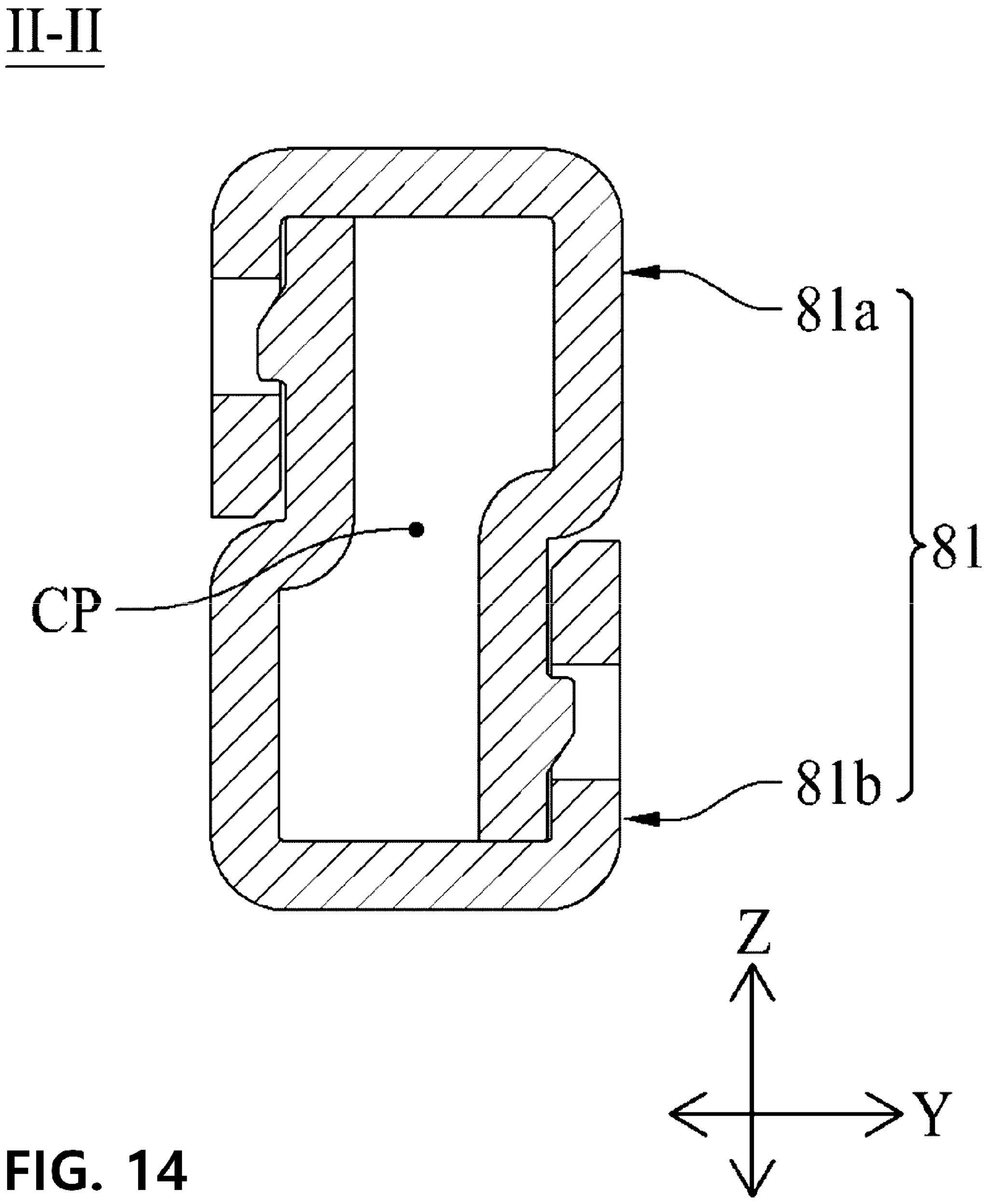
FIG. 14 is a schematic side cross-sectional view taken along line II-II of FIG. 13.

The first shielding member 63 may be formed to have the same diameter as the first alignment hole 82 or a smaller diameter than the first alignment hole 82 so as to be inserted into the first alignment hole 82. For example, as shown in FIG. 9, the diameter of the first shielding member 63 may be formed to be smaller than the diameter of the first alignment hole 82 such that the first shielding member 63 is accommodated in the first alignment hole 82. In this case, the first alignment hole 82 may be disposed between the first shielding member 63 and the first coupling body 81*a*, 81. Accordingly, the connector 1 according to the present disclosure is implemented such that the first shielding member 63 is inserted into the first alignment hole 82 so as to be accommodated in the first alignment hole 82. The coupling body 81 may be disposed to surround the first shielding member 63 that is accommodated in the first alignment hole 82. Accordingly, the coupling body 81 may guide the first connection pin 61 to contact the first RF contact 2 by supporting the first shielding member 63 that is accommodated in the first alignment hole 82. The first alignment hole 82 may be formed in a shape corresponding to the circumferential surface of the first shielding member 63. For example, when the circumferential surface of the first shielding member 63 is formed in a circular shape, the first alignment hole 82 may be formed in a circular shape. The second shielding member 73 may have the same diameter as the second alignment hole 83 or a smaller diameter than the second alignment hole 83 so as to be inserted into the second alignment hole 83. Accordingly, the connector 1 according to the present disclosure is implemented such that the second shielding member 73 is inserted into the second alignment hole 83 to be accommodated in the second alignment hole 83. The coupling body 81 may be disposed to surround the second shielding member 73 that is accommodated in the second alignment hole 83. Accordingly, the coupling body 81 may guide the second connection pin 71 to contact the second RF contact 3 by supporting the second shielding member 73 accommodated in the second alignment hole 83. The second alignment hole 83 may be formed in a shape corresponding to the circumferential surface of the second shielding member 73. For example, when the circumferential surface of the second shielding member 73 is formed in a circular shape, the second alignment hole 83 may be formed in a circular shape.

Referring to FIGS. 5 and 10 to 13, the coupling part 8 may include a first fixing member 84 and a second fixing member 85. Meanwhile, the portion marked with hatching in FIG. 10 does not represent a cross-section, but represents an area covered by the first alignment hole 82 by the first fixing member 84 and an area covered by the second alignment hole 83 by the second fixing member 85.

The first fixing member 84 is for fixing the first shielding member 63 to the coupling body 81. The first fixing member 84 may be formed to protrude from the coupling body 81 toward the first alignment hole 82. As shown in FIGS. 10 to 13, the first fixing member 84 may be implemented by forming a portion of the first alignment hole 82 in a straight line. Accordingly, the first fixing member 84 is disposed to cover a portion of the first alignment hole 82 such that it may interfere with the first shielding member 63 inserted into the first alignment hole 82. Accordingly, the first fixing member 84 presses the first shielding member 63 inserted into the first alignment hole 82 such that the first shielding member 63 is implemented to be fixed with respect to the coupling body 81.

The pressing force of the first alignment hole 82 with respect to the first shielding member 63 may be adjusted by the amount of interference between the first fixing member 84 and the first shielding member 63. As the length of the first fixing member 84 protruding from the first alignment hole 82 increases, the area covered by the first alignment hole 82 by the first fixing member 84 increases, and thus, as the amount of interference between the first fixing member 84 and the first shielding member 63 increases and the length of the first fixing member 84 protruding from the first alignment hole 82 becomes shorter, the area covered by the first alignment hole 82 by the first fixing member 84 becomes smaller, and therefore, the amount of interference between the first fixing member 84 and the first shielding member 63 becomes smaller.

The first fixing member 84 may be formed in plurality. The first fixing members 84 may be spaced apart from each other to be implemented to press different portions of the first shielding member 63. For example, when two of the first fixing member 84 are formed, the 1-1 fixing part 84*a* among the first fixing parts 84*a*, 84*b* may protrude from the first coupling body 81*a* toward the first alignment hole 82, and the 1-2 fixing part 84*b* among the first fixing parts 84*a*, 84*b* may protrude from the second coupling body 81 toward the first alignment hole 82. In this case, the first fixing parts 84*a*, 84*b* may be spaced apart from each other in the third axial direction (Z-axis direction) to be implemented to press different portions of the first shielding member 63. Although not illustrated, the first fixing members 84 may be spaced apart from each other even in the second axial direction (Y-axis direction) to be implemented to press different portions of the first shielding member 63. In addition, the first fixing members 84 may be disposed to be spaced apart from each other along the circumference of the first alignment hole 82 to be spaced apart from each other based on the first axial direction (X-axis direction) to be implemented to press different portions of the first shielding member 63. As described above, it will be apparent to those skilled in the art to which the present disclosure pertains to derive various exemplary embodiments in which according to the position where the first fixing members 84 protrude from the coupling body 81 toward the first alignment hole 82, the first shielding member 63 can be pressed at different positions based on the first axial direction (X-axis direction), the second axial direction (Y-axis direction) and the third axial direction (Z-axis direction).

Accordingly, in the connector 1 according to the present disclosure, since the first shielding member 63 can be more firmly fixed to the coupling body 81, the durability of the product may be further improved. The first fixing member 84 may be formed in three or more. In this case, the first fixing members 84 may be spaced apart from each other to be implemented to press different portions of the first shielding member 63.

The second fixing member 85 is for fixing the second shielding member 73 to the coupling body 81. The second fixing member 85 may be formed to protrude from the coupling body 81 toward the second alignment hole 83. As shown in FIGS. 10 to 13, the second fixing member 85 may be implemented by forming a portion of the second alignment hole 83 in a straight line. Accordingly, the second fixing member 85 may be disposed to cover a portion of the second alignment hole 83 such that it may interfere with the second shielding member 73 inserted into the second alignment hole 83. Accordingly, the second fixing member 85 presses the second shielding member 73 inserted into the second alignment hole 83 such that the second shielding member 73 is implemented to be fixed with respect to the coupling body 81.

The second fixing member 85 may be disposed to be spaced apart in a direction from the first shielding member 63 to the second shielding member 73 with respect to the first fixing member 84 based on the first axial direction (X-axis direction). Accordingly, the second fixing member 85 is implemented to fix the second shielding member 73 which is disposed to be spaced apart from the first shielding member 63 based on the first axial direction (X-axis direction). Therefore, the connector 1 according to the present disclosure is implemented to fix both of the first shielding member 63 and the second shielding member 73 through the coupling part 8 such that the durability of the product against vibration, shaking, external impact or the like may be further improved.

The pressing force of the second alignment hole 83 with respect to the second shielding member 73 may be adjusted by the amount of interference between the second fixing member 85 and the second shielding member 73. As the length of the second fixing member 85 protruding from the second alignment hole 83 increases, the area covered by the second fixing member 85 becomes larger, and thus, as the amount of interference between the second fixing member 85 and the second shielding member 73 increases and the length of the second fixing member 85 protruding from the second alignment hole 83 becomes shorter, the area covered by the second alignment hole 83 by the second fixing member 85 is reduced, and thus, the amount of interference between the second fixing member 85 and the second shielding member 73 is reduced.

The second fixing member 85 may be formed in plurality. The second fixing members 85 may be spaced apart from each other to press different portions of the second shielding member 73. For example, when two of the second fixing member 85 are formed, the 2-1 fixing part 85*a* among the second fixing parts 85*a*, 85*b* may protrude from the first coupling body 81*a* toward the second alignment hole 83, and the 2-2 fixing part 85*b* among the first fixing parts 84*a*, 84*b* may protrude from the second coupling body 81*b* toward the second alignment hole 83. In this case, the second fixing parts 85*a*, 85*b* may be spaced apart from each other in the third axial direction (Z-axis direction) to be implemented to press different portions of the second shielding member 73. Although not illustrated, the second fixing members 85 may be spaced apart from each other even based on the second axial direction (Y-axis direction) to be implemented to press different portions of the second shielding member 73. In addition, the second fixing members 85 may be spaced apart from each other along the circumference of the second alignment hole 83 to be spaced apart from each other based on the first axial direction (X-axis direction) to be implemented to press different portions of the second shielding member 73. As described above, it will be apparent to those skilled in the art to which the present disclosure pertains to derive various exemplary embodiments in which according to the position where the second fixing members 85 protrude from the coupling body 81 toward the second alignment hole 83, the second shield member 73 may be pressed at different positions based on the first axial direction (X-axis direction), the second axial direction (Y-axis direction) and the third axial direction (Z-axis direction).

Accordingly, in the connector 1 according to the present disclosure, since the second shielding member 73 can be more firmly fixed to the coupling body 81, the durability of the product may be further improved. The second fixing member 85 may be formed in three or more. In this case, the second fixing members 85 may be spaced apart from each other to be implemented to press different portions of the second shielding member 73.

The first shielding member 63 may be grounded through the coupling part 8 to shield the inside of the first shielding member 63. A circuit component that is required for RF signal transmission may be disposed inside the first shielding member 63. For example, a portion of the first connection pin 61 may be disposed inside the first shielding member 63. Accordingly, the connector 1 according to the present disclosure may prevent electromagnetic waves that are generated inside the first shielding member 63 from interfering with signals of circuit components that are located nearby, and may conversely prevent electromagnetic waves that are generated from the circuit components located nearby from interfering with RF signals that are transmitted through the inside of the first shielding member 63. Therefore, the connector 1 according to the present disclosure may contribute to improving the electro-magnetic interference (EMI) shielding performance and electro-magnetic compatibility (EMC) performance for the first coaxial cable 6 through the coupling part 8.

The second shielding member 73 may be grounded through the coupling part 8 to shield the inside of the second shielding member 73. Since the structure for shielding the inside of the second shielding member 73 through the coupling part 8 is substantially the same as the structure for shielding the inside of the first shielding member 63 as described above, the detailed descriptions thereof will be omitted.

The coupling body 81 may include a separation member 813 for spacing the first coaxial cable 6 and the second coaxial cable 7 along the first axial direction (X-axis direction). The separation member 813 may be disposed between the first alignment hole 82 and the second alignment hole 83 with respect to the first axial direction (X-axis direction). Accordingly, the first coaxial cable 6 inserted into the first alignment hole 82 and the second coaxial cable 7 inserted into the second alignment hole 83 may be spaced apart from each other based on the first axial direction (X-axis direction) to be coupled to the coupling body 81. Therefore, the connector 1 according to the present disclosure may prevent the first coaxial cable 6 and the second coaxial cable 7 from contacting each other by using the separation member 813 such that it is possible to fundamentally prevent the first coaxial cable 6 and the second coaxial cable 7 from being damaged or destroyed as a result of bumping into or being stamped on each other due to vibration or shaking.

The coupling body 81 may include a first rear shielding member 811 (illustrated in FIG. 9) and a second rear shielding member 812 (illustrated in FIG. 9). The first rear shielding member 811 and the second rear shielding member 812 serve to shield the rear surface of the cover shell 5. The first rear shielding member 811 and the second rear shielding member 812 may be disposed to be spaced apart from each other based on the second axial direction (Y-axis direction). For example, the first rear shielding member 811 may be disposed on the front side of the second rear shielding member 812 (FD arrow direction). Accordingly, the first rear shielding member 811 and the second rear shielding member 812 may be implemented as double shielding walls for the rear surface of the cover shell 5. Accordingly, the connector 1 according to the present disclosure may further improve the function of shielding the rear surface of the cover shell 5 by using the coupling part 8.

The first alignment hole 82 may be formed through the first rear shielding member 811 and the second rear shielding member 812. Accordingly, the first coaxial cable 6 may be respectively coupled to the first rear shielding member 811 and the second rear shielding member 812 by being inserted into the first alignment hole 82. The second alignment hole 83 may be formed through the first rear shielding member 811 and the second rear shielding member 812. Accordingly, the second coaxial cable 7 may be respectively coupled to the first rear shielding member 811 and the second rear shielding member 812 by being inserted into the second alignment hole 83.

The first fixing members 84 may be respectively coupled to the first rear shielding member 811 and the second rear shielding member 812. Accordingly, the connector 1 according to the present disclosure may implement a multi-fixing structure for the first coaxial cable 6 by using the coupling part 8 based on the second axial direction (Y-axis direction). Specifically, some of the first fixing members 84 may be coupled to the first rear shielding member 811, and the rest of the first fixing members 84 may be coupled to the second rear shielding member 812. For example, when there are four first fixing members 84, two of the first fixing members 84 are coupled to the first rear shielding member 811, and the remaining two of the first fixing members 84 may be coupled to the second rear shielding member 812. Accordingly, in the connector 1 according to the present disclosure, the first fixing members 84 may be spaced apart along the second axial direction (Y-axis direction) to fix the first shielding member 63 to the coupling body 81. Accordingly, the connector 1 according to the present disclosure may implement a multi-fixing structure for the first coaxial cable 6 based on the second axial direction (Y-axis direction) such that it is possible to further improve the stability of the structure in which the first coaxial cable 6 is fixed to the coupling part 8.

The second fixing members 85 may be respectively coupled to the first rear shielding member 811 and the second rear shielding member 812. Accordingly, the connector 1 according to the present disclosure may implement a multi-fixing structure for the second coaxial cable 7 by using the coupling part 8 based on the second axial direction (Y-axis direction). Since this is approximately the same as the content described above through the first fixing member 84, the detailed description thereof will be omitted.

Figure 5:
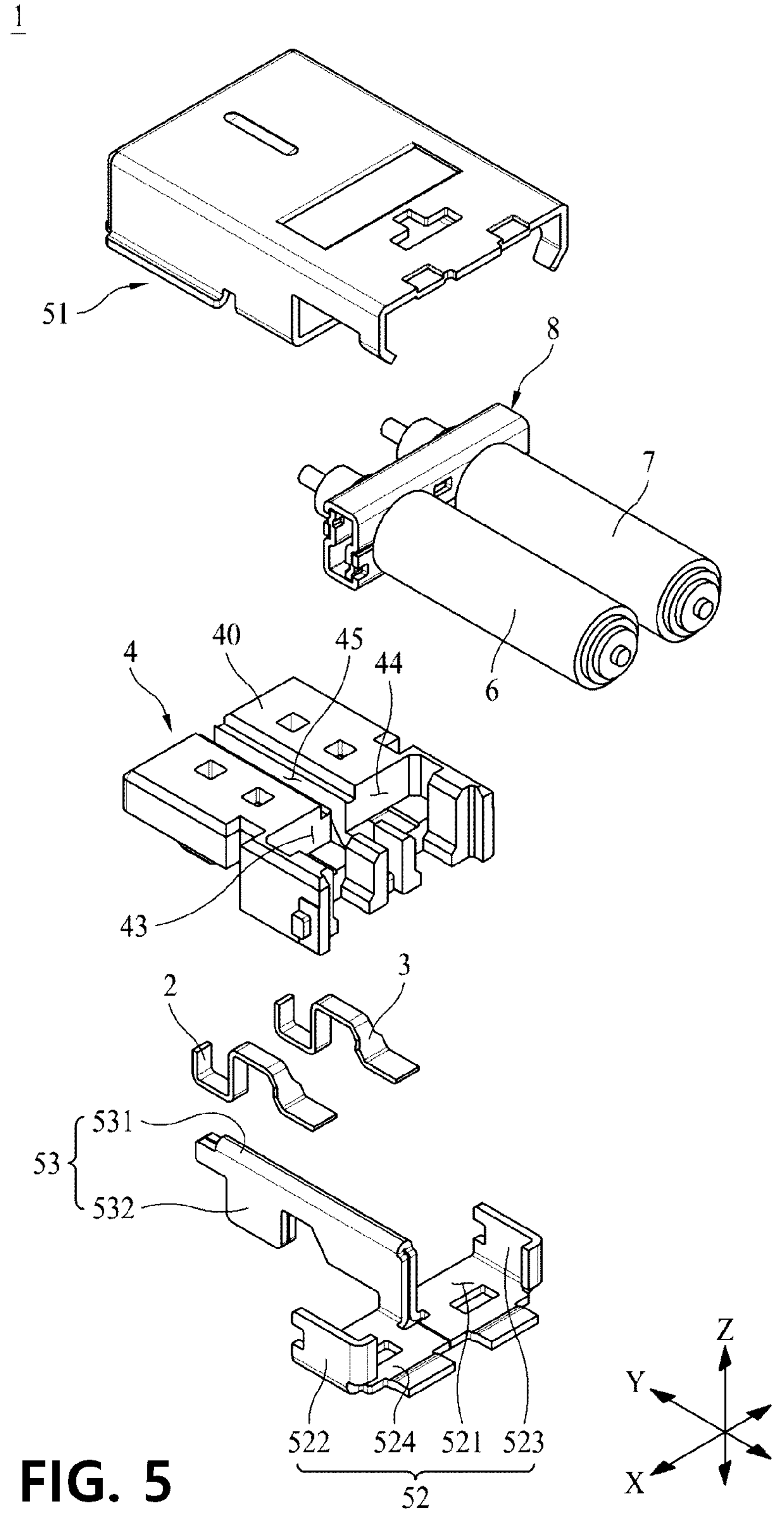
FIG. 5 is a schematic exploded perspective view of the connector according to the present disclosure.
Figure 6:
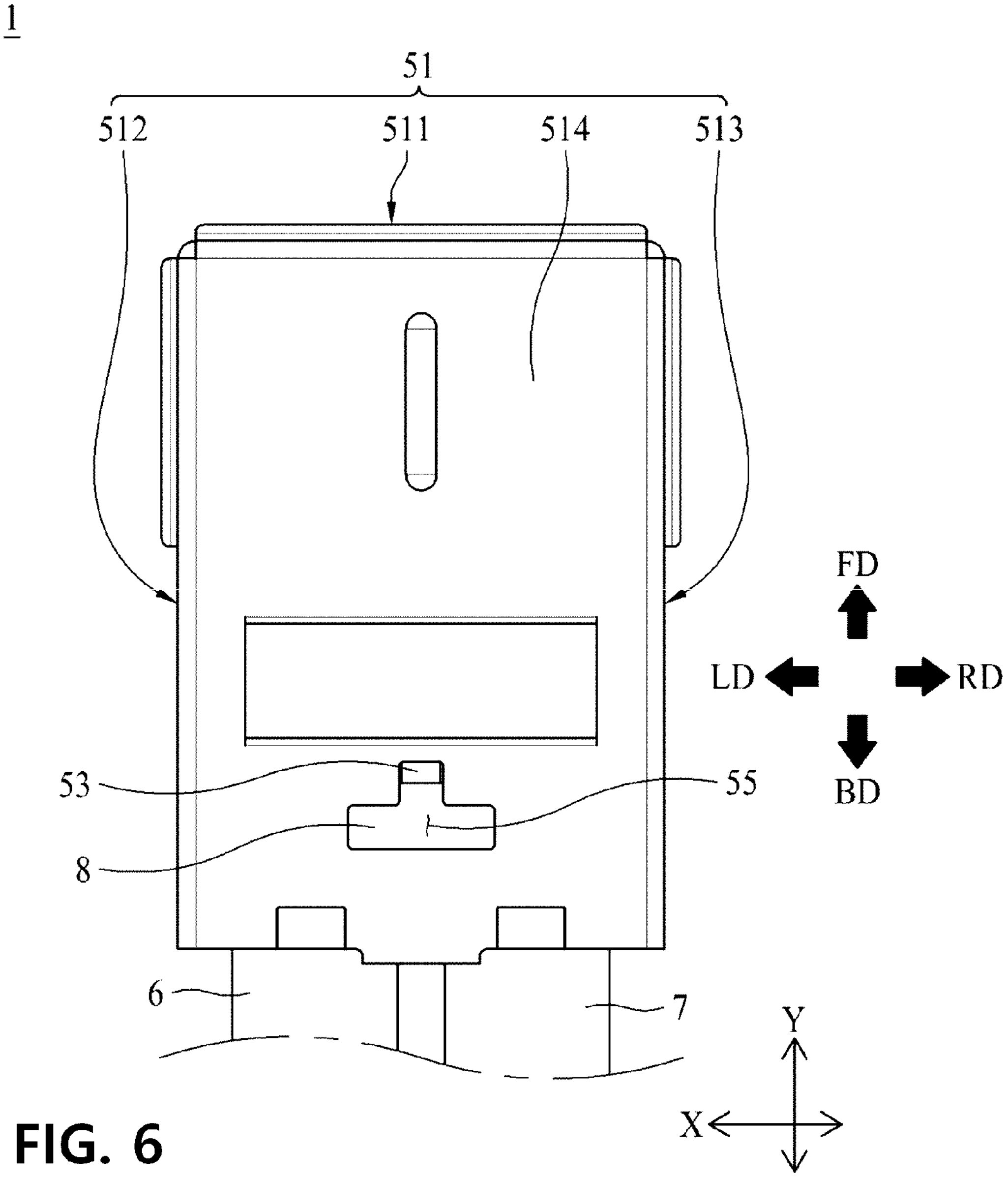
FIG. 6 is a schematic plan view of the connector according to the present disclosure.

The cover shell 5 may include a partition wall part 53 (illustrated in FIG. 5).

The partition wall part 53 is for shielding between the first RF contact 2 and the second RF contact 3. The partition wall part 53 may be disposed between the first RF contact 2 and the second RF contact 3 based on the first axial direction (X-axis direction). The partition wall part 53 may be inserted into the partition wall hole 45 formed in the insulating body 40 to be disposed between the first RF contact 2 and the second RF contact 3. The partition wall hole 45 may be formed through the insulating body 40. The partition wall part 53 may be grounded to shield between the first RF contact 2 and the second RF contact 3. Accordingly, the connector 1 according to the present disclosure may prevent the interference of RF signals between the first RF contact 2 and the second RF contact 3. The partition wall part 53 may be coupled to the lower support member 524. The partition wall part 53 may be formed to extend along the second axial direction (Y-axis direction). The partition wall part 53 may be formed of a thin plate made of a material having electrical conductivity. For example, the partition wall part 53 may be a metal plate.

The partition wall part 53 may include a partition wall body 531 (illustrated in FIG. 8) and a ground contact 532 (illustrated in FIG. 7).

The partition wall body 531 shields between the first RF contact 2 and the second RF contact 3. The partition wall body 531 may be disposed between the first RF contact 2 and the second RF contact 2 based on the first axial direction (X-axis direction) so as to cover between the first RF contact 2 and the second RF contact 3. Based on the partition wall body 531, the first RF contact 2 and the first coaxial cable 6 may be disposed on one side, and the second RF contact 3 and the second coaxial cable 7 may be disposed on the other side. The partition wall body 531 may be grounded through the ground contact 532 to perform a shielding function.

The ground contact 532 is connected to a ground contact (not illustrated) of the first counterpart connector 111. The ground contact 532 may be coupled to the partition wall body 531. The ground contact 532 may be connected to a counterpart ground contact of the first counterpart connector 111 through the connection hole of the cover shell 5. The ground contact 532 may be disposed between the first RF protrusion 41 and the second RF protrusion 42. Accordingly, the ground contact 532 may shield between the first RF contact 2 that is positioned on the first RF protrusion 41 and the second RF contact 3 that is positioned on the second RF protrusion 42.

Figure 8:
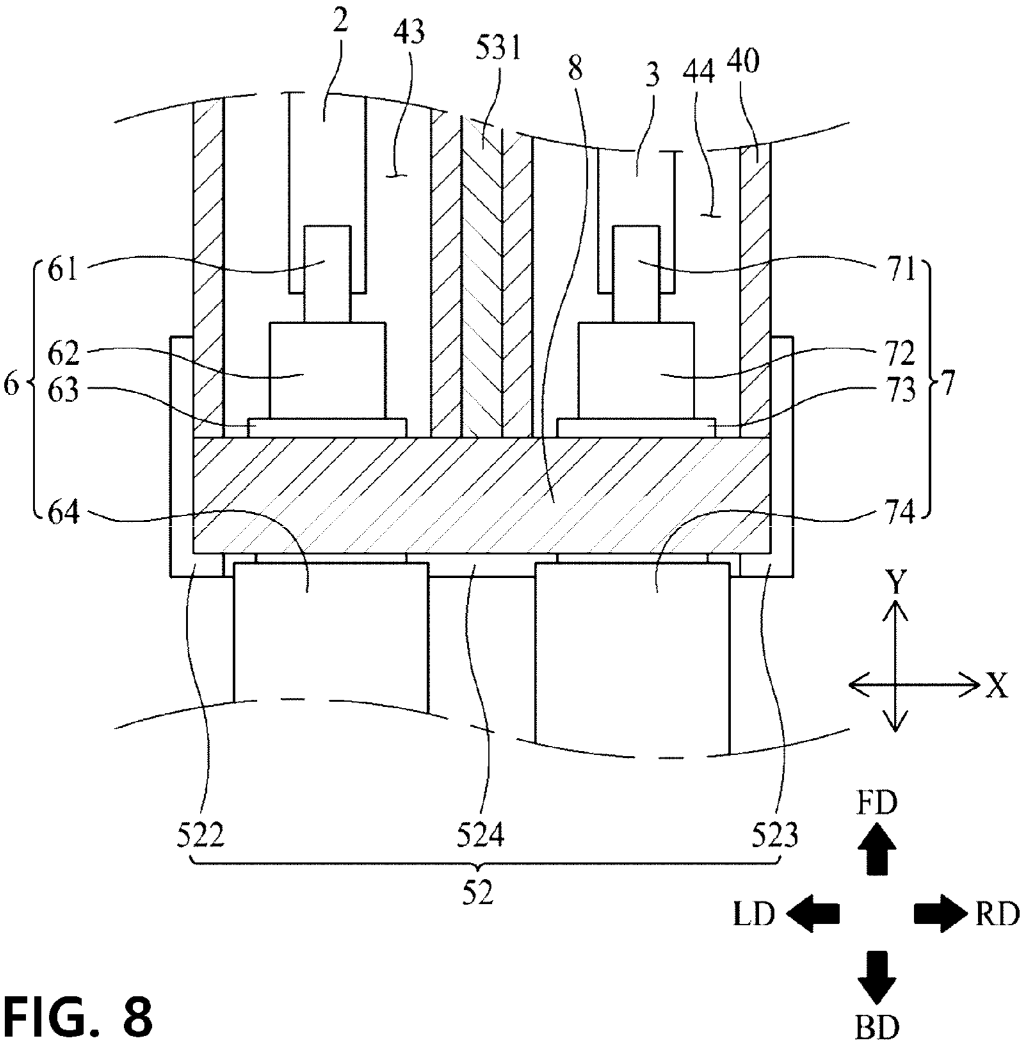
FIG. 8 is a partial plan view showing the inside of the connector according to the present disclosure.

The coupling part 8 may be grounded through the partition wall part 53 to shield the rear surface of the cover shell 5. For example, as shown in FIG. 8, when the first rear shielding member 811 is disposed on the front side of the second rear shielding member 812 (FD arrow direction), the first rear shielding member 811 may be connected to the partition wall part 53 to be grounded. Specifically, the first rear shielding member 811 may be grounded by being connected to an end of the partition wall body 531 that is disposed on the rear side (BD arrow direction) based on the second axial direction (Y-axis direction). Accordingly, the first rear shielding member 811 and the second rear shielding member 812 may be grounded through the partition wall body 531 to perform a shielding function.

The cover shell 5 may include a connection inspection window 55. The connection inspection window 55 is for inspecting whether the partition wall part 53 and the coupling part 8 are connected. The connection inspection window 55 may be formed through the first cover body 51. Accordingly, the connector 1 according to the present disclosure is implemented to allow the operator to see the inside of the cover shell through the connection inspection window 55 without separating the first cover body 51 and the second cover body 52. The connection inspection window 55 may be located at a point where the partition wall part 53 and the coupling part 8 are connected. Accordingly, the operator may check whether the partition wall part 53 and the coupling part are connected through the connection inspection window 55 without separating the first cover body 51 and the second cover body 52. Therefore, the connector 1 according to the present disclosure may improve the convenience and easiness of the operation of inspecting whether the partition wall part 53 and the coupling part 8 are connected through the connection inspection window 55.

Although not illustrated, the connection inspection window 55 may be formed on the second cover body 52. The connection inspection window 55 may be formed in plurality. In this case, the connection inspection windows 55 may be formed in both of the first cover body 51 and the second cover body 52.

Hereinafter, an exemplary embodiment in which the coupling body 81 is formed by assembling two units will be described in detail with reference to FIGS. 11 to 15.

Referring to FIGS. 11 to 15, the coupling part 8 may include a first coupling body 81*a* and a second coupling body 81*b* that are detachably coupled to each other, and the assembly member 86.

The first coupling body 81*a* constitutes a portion of the coupling body 81. The first coupling body 81*a* may be coupled to the second coupling body 81*b* to form the coupling body 81. The second coupling body 81*b* constitutes the remaining portion of the coupling body 81. The second coupling body 81*b* may be coupled to the first coupling body 81*a* to form the coupling body 81. Accordingly, the connector 1 according to the present disclosure can achieve the following effects.

First, since the connector 1 according to the present disclosure is implemented such that only the defective portion can be replaced as compared to the comparative example in which the coupling body 81 is made integrally, the manufacturing cost can be lowered. This is because, in the case of the comparative example, when a defect occurs in the coupling body 81, all of them must be discarded, whereas in the connector 1 according to the present disclosure, only the defective portion may be replaced.

Second, the connector 1 according to the present disclosure may improve the easiness of the operation of coupling the first coaxial cable 6 and the second coaxial cable 7 to the coupling body 81. For example, in the case of the comparative example, the operation of inserting the first coaxial cable 6 into the first alignment hole 82 may be hindered by the first fixing member 84 formed on the coupling body 81, whereas the connector 1 according to the present disclosure couples the first coupling body 81*a* to the first coaxial cable 6, and sequentially couples the second coupling body 81*b* to the second coaxial cable 7 such that the first coaxial cable can be inserted into the first alignment hole 82 without being disturbed by the first fixing member 84. Therefore, the connector 1 according to the present disclosure may improve the easiness of the operation of coupling the first coaxial cable 6 and the second coaxial cable 7 to the coupling body 81 as compared to the comparative example.

When the coupling part 8 includes the first coupling body 81*a* and the second coupling body 81*b*, the first coupling body 81*a* and the second coupling body 81*b* may be formed in the same shape as each other. Accordingly, since the connector 1 according to the present disclosure can reduce the manufacturing equipment for producing the coupling body 81, the manufacturing cost for the coupling body 81 may be further lowered, and since the operator can assemble the first coupling body 81*a* and the second coupling body 81*b* without distinguishing the same, it is possible to reduce man-hours and further improve manufacturing convenience. In this case, the first coupling body 81*a* and the second coupling body 81*b* may be disposed point-symmetrically to be implemented to be coupled to each other based on a midpoint of one side and the other side of the first coupling body 81*a* based on the second axis direction (Y-axis direction) and a center point (CP) that is located in the center point of one side and the other side of the first coupling body 81*a* based on a third axis direction (Z-axis direction) perpendicular to the first axis direction (X-axis direction) and the second axis direction (Y-axis direction).

The assembly member 86 is for detachably coupling the first coupling body 81*a* and the second coupling body 81*b*. The assembly member 86 may include an assembly protrusion 861 that is formed on at least one of the first coupling body 81*a* or the second coupling body 81*b*, and an assembly hole 862 into which the assembly protrusion 861 is inserted. For example, when the assembly protrusion 861 is formed in the first coupling body 81*a*, the assembly protrusion 861 is inserted into the assembly hole 862 formed in the second coupling body 81*b* so as to couple the first coupling body 81*a* and the second coupling body 81*b*. In this case, when the assembly protrusion 861 inserted into the assembly hole 862 is separated from the assembly hole 862, the first coupling body 81*a* and the second coupling body 81*b* may be separated again. For example, when the assembly protrusion 861 is formed on the second coupling body 81*b*, the assembly protrusion 861 may be inserted into the assembly hole 862 formed in the first coupling body 81*a* such that the first coupling body 81*a* and the second coupling body 81*b* may be coupled. When the first coupling body 81*a* and the second coupling body 81*b* are formed in the same shape, both of the assembly protrusion 861 and the assembly hole 862 may be formed in the first coupling body 81*a*. In this case, since the second coupling body 81*b* is formed in the same shape as the first coupling body 81*a*, both of the assembly protrusion 861 and the assembly hole 862 may be formed in the second coupling body 81*b*. Accordingly, the assembly protrusion 861 formed in the first coupling body 81*a* may be inserted into the assembly hole 862 formed in the second coupling body 81*b*, and the assembly protrusion 861 formed in the second coupling body 81*b*. 861 may be inserted into the assembly hole 862 formed in the first coupling body 81*a* so as to couple the first coupling body 81*a* and the second coupling body 81*b*. Hereinafter, the first coupling body 81*a* will be described in detail based on an exemplary embodiment in which the first coupling body 81*a* and the second coupling body 81*b* are formed in the same shape. It will be apparent to those skilled in the art to derive the second coupling body 81*b* therefrom.

Figure 15:
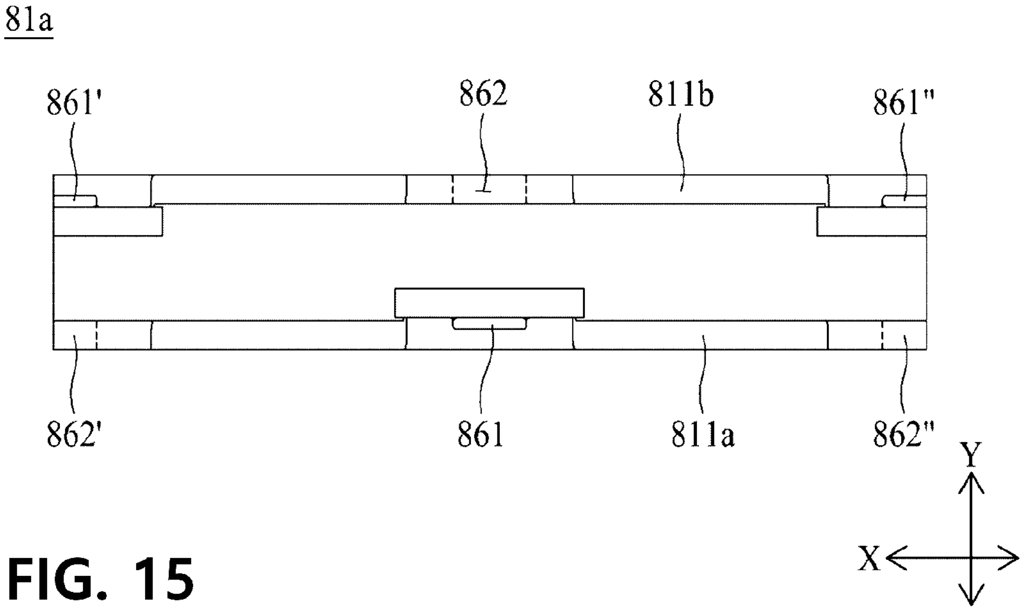
FIG. 15 is a schematic plan view of the first coupling body in the connector according to the present disclosure.

Referring to FIG. 15, the assembly protrusion 861 and the assembly hole 862 may be formed in plurality. The assembly protrusions 861, 861', 861" may be disposed to be spaced apart from each other in the first axial direction (X-axis direction). Some of the assembly protrusions 861, 861', 861" may be coupled to the first rear shielding member 811*a* of the first coupling body 81*a*, and the rest of the assembly protrusions 861, 861', 861" may be coupled to the second rear shielding member 812*a* of the first coupling body 81*a*. The assembly holes 862, 862', 862" may be disposed to be spaced apart along the first axial direction (X-axis direction). Some of the assembly holes 862, 862', 862" may be coupled to the first rear shielding member 811*a* of the first coupling body 81*a*, and the rest of the assembly holes 862, 862', 862" may be coupled to the second rear shielding member 812*a* of the first coupling body 81*a*.

The present disclosure described above is not limited to the above-described exemplary embodiments and the accompanying drawings, and it will be apparent to those of ordinary skill in the art to which the present disclosure pertains that various substitutions, modifications and changes are possible without departing from the technical spirit of the present disclosure.

The invention claimed is:

1. A connector, comprising:

a first radio frequency (RF) contact for transmitting an RF signal;

a second RF contact which is disposed away from the first RF contact along a first axis direction (X-axis direction);

an insulating part to which the first RF contact and the second RF contact are coupled;

a cover shell which is coupled to the insulating part;

a first coaxial cable which is electrically connected to the first RF contact, and that extends in a second axis direction (Y-axis direction) which is perpendicular to the first axis direction (X-axis direction);

a second coaxial cable which is located away from the first coaxial cable along the first axis direction (X-axis direction) and electrically connected to the second RF contact, and that extends in the second axis direction (Y-axis direction); and a coupling part for coupling the first coaxial cable and the second coaxial cable to the cover shell such that the first coaxial cable is connected to the first RF contact and the second coaxial cable is connected to the second RF contact, wherein a rear surface of the cover shell is open such that the first coaxial cable and the second coaxial cable are inserted therein, wherein the coupling part is grounded by means of the cover shell to be able to block the rear surface, wherein the cover shell is opened at one side in a third axis direction (Z-axis direction), which is perpendicular to the first axis direction (X-axis direction) and the second axis direction (Y-axis direction), respectively, such that the one side in the third axis direction is mated with a counterpart connector, wherein a front surface of the cover shell, opposite to the rear surface, is continuous with a first side surface of the cover shell on a first edge defined by a first end of the front surface and is continuous with a second side surface of the cover shell on a second edge defined by a second end of the front surface, wherein the first side surface is disposed between the front surface and the rear surface, wherein the second side surface is disposed between the front surface and the rear surface opposite to the first side surface, and wherein the cover shell is disposed between the first RF contact and the second RF contact based on the first axis direction (X-axis direction), and comprises a partition wall part for shielding between the first RF contact and the second RF contact.

2. The connector of claim 1, wherein the coupling part comprises a first alignment hole into which the first coaxial cable is inserted, a second alignment hole into which the second coaxial cable is inserted, and a coupling body in which the first alignment hole and the second alignment hole are formed, and wherein the coupling body aligns the first coaxial cable such that the first coaxial cable which is inserted into the first alignment hole is disposed at a position where it can be connected to the first RF contact.

3. The connector of claim 2, wherein the first coaxial cable comprises a first connection pin which is connected to the first RF contact, and a first shielding member which is coupled to the first connection pin, and wherein the first shielding member is formed to have a diameter equal or smaller to a diameter of the first alignment hole so as to be inserted into the first alignment hole.

4. The connector of claim 3, wherein the coupling part comprises a first fixing member for fixing the first shielding member that is inserted into the first alignment hole to the coupling body, and wherein the first fixing member protrudes from the coupling body toward the first alignment hole.

5. The connector of claim 4, wherein the coupling body comprises a first rear shielding member and a second rear shielding member which are disposed to be spaced apart from each other based on the second axis direction (Y-axis direction) perpendicular to the first axis direction (X-axis direction), wherein the first fixing member is one of a plurality of first fixing members; and wherein a first portion of first fixing members of the plurality of first fixing members are coupled to the first rear shielding member, and a remainder of the first fixing members of the plurality of first fixing members that are not part of the first portion are coupled to the second rear shielding member.

6. The connector of claim 3, wherein the first shielding member is grounded through the coupling part to shield an inside of the first shielding member.

7. The connector of claim 1, wherein the coupling part comprises a first alignment hole into which the first coaxial cable is inserted, a second alignment hole into which the second coaxial cable is inserted, and a coupling body in which the first alignment hole and the second alignment hole are formed, wherein the coupling body comprises a separation member for separating the first coaxial cable and the second coaxial cable along the first axis direction (X-axis direction), and wherein the separation member is disposed between the first alignment hole and the second alignment hole based on the first axis direction (X-axis direction).

8. The connector of claim 1, wherein the coupling part comprises a first rear shielding member and a second rear shielding member which are disposed to be spaced apart from each other based on a second axis direction (Y-axis direction) perpendicular to the first axis direction (X-axis direction), and wherein the first rear shielding member and the second rear shielding member are implemented as double shielding walls for the rear surface.

9. The connector of claim 1, wherein the coupling part is grounded through the partition wall part to shield the rear surface.

10. The connector of claim 1, wherein the cover shell comprises a connection inspection window, and wherein the connection inspection window is located at a point where the partition wall part and the coupling part are connected.

11. The connector of claim 1, wherein the coupling part comprises a first coupling body and a second coupling body that are detachably coupled to each other, and wherein the first coupling body and the second coupling body are formed in an equivalent same shape as each other.

12. The connector of claim 1, wherein the coupling part comprises a first coupling body and a second coupling body which are detachably coupled to each other, and an assembly member for detachably coupling the first coupling body and the second coupling body, and wherein the assembly member comprises an assembly protrusion which is formed on at least one of the first coupling body and the second coupling body, and an assembly hole into which the assembly protrusion is inserted.

13. A connector, comprising:

a first radio frequency (RF) contact for transmitting an RF signal;

a second RF contact which is disposed away from the first RF contact along a first axis direction (X-axis direction);

an insulating part to which the first RF contact and the second RF contact are coupled;

a cover shell which is coupled to the insulating part;

a first coaxial cable which is electrically connected to the first RF contact;

a second coaxial cable which is located away from the first coaxial cable along the first axis direction (X-axis direction) and electrically connected to the second RF contact; and a coupling part for coupling the first coaxial cable and the second coaxial cable to the cover shell such that the first coaxial cable is connected to the first RF contact and the second coaxial cable is connected to the second RF contact, wherein a rear surface of the cover shell is open such that the first coaxial cable and the second coaxial cable are inserted therein, wherein the coupling part is grounded by means of the cover shell to be able to block the rear surface, wherein the cover shell is disposed between the first RF contact and the second RF contact based on the first axis direction (X-axis direction), and comprises a partition wall part for shielding between the first RF contact and the second RF contact, wherein the cover shell comprises a connection inspection window, and wherein the connection inspection window is located at a point where the partition wall part and the coupling part are connected.

14. A connector, comprising:

a first radio frequency (RF) contact for transmitting an RF signal;

a second RF contact which is disposed away from the first RF contact along a first axis direction (X-axis direction);

an insulating part to which the first RF contact and the second RF contact are coupled;

a cover shell which is coupled to the insulating part;

a first coaxial cable which is electrically connected to the first RF contact, and that extends in a second axis direction (Y-axis direction) which is perpendicular to the first axis direction (X-axis direction);

a second coaxial cable which is located away from the first coaxial cable along the first axis direction (X-axis direction) and electrically connected to the second RF contact, and that extends in the second axis direction (Y-axis direction); and a coupling part for coupling the first coaxial cable and the second coaxial cable to the cover shell such that the first coaxial cable is connected to the first RF contact and the second coaxial cable is connected to the second RF contact, wherein a rear surface of the cover shell is open such that the first coaxial cable and the second coaxial cable are inserted therein, wherein the coupling part is grounded by means of the cover shell to be able to block the rear surface, wherein the cover shell is opened at one side in a third axis direction (Z-axis direction), which is perpendicular to the first axis direction (X-axis direction) and the second axis direction (Y-axis direction), respectively, such that the one side in the third axis direction is mated with a counterpart connector, wherein a front surface of the cover shell, opposite to the rear surface, is continuous with a first side surface of the cover shell on a first edge defined by a first end of the front surface and is continuous with a second side surface of the cover shell on a second edge defined by a second end of the front surface, wherein the first side surface is disposed between the front surface and the rear surface, wherein the second side surface is disposed between the front surface and the rear surface opposite to the first side surface, wherein the coupling part comprises a first alignment hole into which the first coaxial cable is inserted, a second alignment hole into which the second coaxial cable is inserted, and a coupling body in which the first alignment hole and the second alignment hole are formed, and wherein the coupling body aligns the first coaxial cable such that the first coaxial cable which is inserted into the first alignment hole is disposed at a position where it can be connected to the first RF contact.

* * * * *